United States Patent
Niinuma

(10) Patent No.: US 8,520,914 B2
(45) Date of Patent: Aug. 27, 2013

(54) AUTHENTICATION APPARATUS AND AUTHENTICATION METHOD

(75) Inventor: Koichiro Niinuma, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 997 days.

(21) Appl. No.: 12/323,668

(22) Filed: Nov. 26, 2008

(65) Prior Publication Data

US 2009/0245596 A1  Oct. 1, 2009

(30) Foreign Application Priority Data

Mar. 27, 2008 (JP) ................................ 2008-084647

(51) Int. Cl.
*G06K 9/00* (2006.01)

(52) U.S. Cl.
USPC ......................................... 382/125; 340/5.83

(58) Field of Classification Search
USPC ........ 382/115–127, 135–137, 190; 340/5.52, 340/5.53, 5.82, 5.83
See application file for complete search history.

(56) References Cited

U.S. PATENT DOCUMENTS

| | | | |
|---|---|---|---|
| 5,974,176 A | 10/1999 | Hsu et al. | |
| 7,362,888 B2 | 4/2008 | Abiko | |
| 2003/0012413 A1 | 1/2003 | Kusakari et al. | |
| 2006/0280346 A1* | 12/2006 | Machida | 382/124 |
| 2007/0014443 A1* | 1/2007 | Russo | 382/124 |
| 2007/0215558 A1* | 9/2007 | Niinuma et al. | 210/767 |
| 2008/0037001 A1* | 2/2008 | Yokoyama et al. | 356/51 |
| 2008/0247615 A1 | 10/2008 | Mainguet | |

FOREIGN PATENT DOCUMENTS

| | | |
|---|---|---|
| EP | 0 866 424 A2 | 9/1998 |
| EP | 1 248 226 A2 | 10/2002 |
| JP | 10-124685 | 5/1998 |
| JP | 2002-279413 | 9/2002 |
| JP | 2003-30659 | 1/2003 |
| JP | 2005-143804 | 6/2005 |
| JP | 2007-37652 | 2/2007 |
| JP | 2007-511845 | 5/2007 |
| JP | 2007-244772 | 9/2007 |
| WO | 98/10370 | 3/1998 |
| WO | WO 0124700 A1 * | 4/2001 |
| WO | WO 2004/023999 | 3/2004 |

OTHER PUBLICATIONS

Antonelli et al. "Fake Finger Detection by Skin Distortion Analysis." IEEE Transactions on Information Forensics and Security, vol. 1, No. 3, Sep. 2006, pp. 360-373.*
European Search Report dated Oct. 12, 2010 in corresponding European Patent Application 08169860.7.
Japanese Office Action mailed Jul. 3, 2012 issued in corresponding Japanese Patent Application No. 2008-084647.

* cited by examiner

*Primary Examiner* — Jon Chang
(74) *Attorney, Agent, or Firm* — Staas & Halsey LLP.

(57) ABSTRACT

The present invention relates to authentication information using bio information such as fingerprints. Identification accuracy whether a living body or a forgery (non living body) is improved to prevent an authentication error. The present invention particularly relates to an authentication apparatus (a fingerprint authentication apparatus), an authentication method, an authentication program and a recording medium. By detecting characteristics not shown in a living body that a forgery (non-living body) has, the characteristic such as uniform reducing feature by the passage of time of a gummy finger (a false finger) made like a bio finger, whether a living body or a forgery is determined, a determination error of a living body by a forgery is prevented, and authentication accuracy of a living body is enhanced.

28 Claims, 31 Drawing Sheets

2 : FALSE FINGER (FEATURE POINTS EXTRACTED FROM BIO FINGER)

4 BIO FINGER IMAGE (FEATURE POINTS EXTRACTED FROM FALSE FINGER)

6 FALSE FINGER IMAGE (POSITION ADJUSTMENT AT THE CENTER OF FINGERPRINTS)

4,6

(FIRST FEATURE POINTS EXTRACTED FROM BIO FINGER)

(SECOND FEATURE POINTS EXTRACTED FROM BIO FINGER)

(POSITION ADJUSTMENT AT THE CENTER OF FINGERPRINTS)

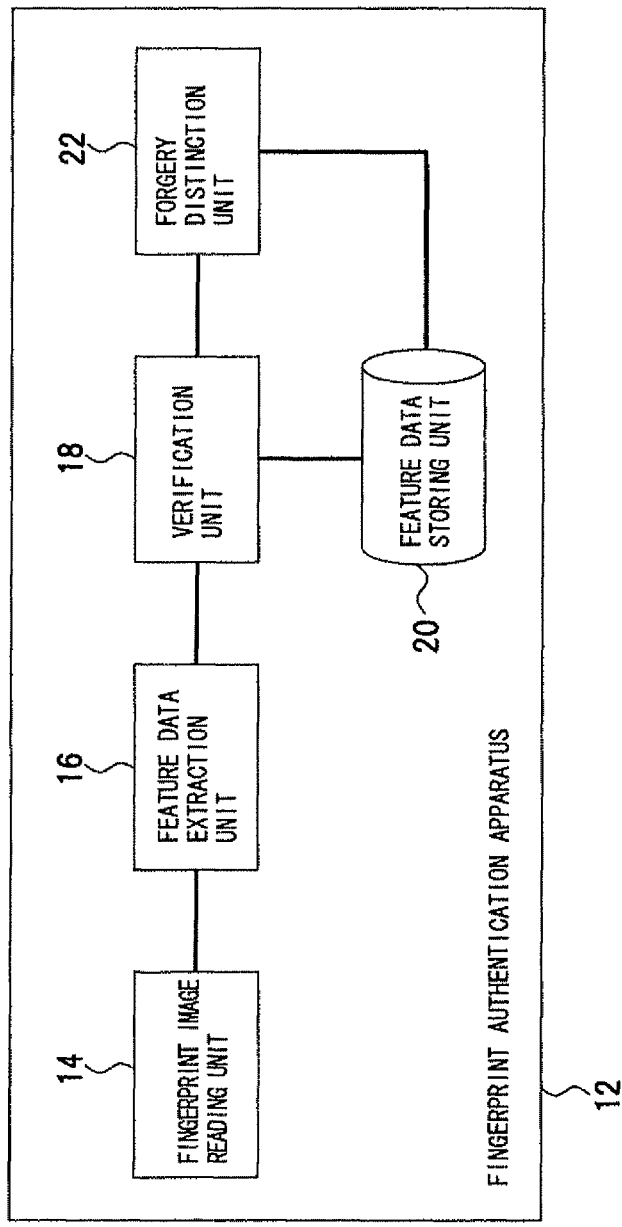

US 8,520,914 B2

AUTHENTICATION APPARATUS AND AUTHENTICATION METHOD

CROSS-REFERENCE TO RELATED APPLICATIONS

This application is based upon and claims the benefit of priority of the prior Japanese Patent Application No. 2008-084647, filed on Mar. 27, 2008, the entire contents of which are incorporated herein by reference.

BACKGROUND

1. Field of the Invention

The present invention relates to personal identification using bio information such as fingerprints. More particularly, the present invention relates to an authentication apparatus, an authentication method and an authentication program that allow distinction of a forgery such as a false finger by using a changing tendency of a form that a forgery such as a false finger has.

2. Description of the Related Art

In personal authentication, password authentication and an ID card authentication are used conventionally. These authentications have a high risk of theft. Thus, as more reliable personality authentication, authentication using bio information such as fingerprints is used. This authentication is utilized in various situations. Even if fingerprints are used, there still remains a risk by a false finger. In biometric authentication, authentication by a forgery is noted. Especially in fingerprints authentication, concerning false fingerprints (gummy fingerprints) made from gelatin, which appears in recent years, there is inconvenience that many fingerprint sensors regard the false finger as a bio finger.

As technique for excluding abuse by false fingerprints, there are patent documents such as Japanese Laid-open Patent Publication No. 2005-143804, International Publication Pamphlet No. WO2004/023999 and Japanese Laid-open Patent Publication No. 2002-279413. JP 2005-143804 discloses that a plurality of square wave input voltages having different frequencies are applied to a subject, output voltages which are responses thereto are measured to calculate impedance, and it is discriminated whether a finger is of a living body or not by investigating whether the impedance is within a range of reference impedance.

WO 2004/023999 discloses that when a plurality of images are continuously sampled, secrete that is secreted from exocrine glands of the organism skin is detected, and whether the subject is an organism or not is sensed by the existence of the secrete or not.

JP 2002-279413 A discloses that standard deviation of a pixel value of an input fingerprints image is calculated, the difference between the maximum value and the minimum value of the standard deviation values of N frames are given, and if the value thereof is at or larger than a threshold level, it is identified to be bio fingerprints and if below the threshold level, it is identified to be false fingerprints.

By the way, downsizing at low cost is difficult for the conventional art (JP 2005-143804) that needs dedicated hardware in order to prevent an authentication error by a forgery. Specifically, a fingerprint sensor improves in downsizing at low cost, but costs for detection of a false fingerprint since dedicated hardware is needed. In the conventional art (WO 2004/023999) detecting secrete, a dry finger that secretes less secrete may not prevent an authentication error. In the conventional art (JP 2002-279413) that the maximum value and the minimum value of the standard deviation are given from an input fingerprints image and the given values are compared with threshold level, a processor may be complexed and elaborate false fingerprints may not be determined.

Concerning such requests and problems, there is no disclosure nor suggestion thereof in JP 2005-143804, WO 2004/023999 and JP 2002-279413. No disclosure or suggestion about structure and so on for solving them is presented.

SUMMARY

An object of the present invention relates to authentication information using bio information such as fingerprints, and is to improve identification accuracy whether a living body or a forgery (non-living body) and to prevent an authentication error.

Another object of the present invention relates to authentication information using bio information such as fingerprints, and is to allow high accurate determination whether a living body or a forgery without necessity of a complex apparatus such as dedicated hardware.

In order to achieve the above objects, the present invention relates to an authentication apparatus, an authentication method, an authentication program and a recording medium. By detecting characteristics that do not appear in a living body and that a forgery (non-living body) has, the characteristics such as uniform reducing feature by the passage of time of a gummy finger made like a bio finger, whether a living body or a forgery is determined, a determination error of a living body by a forgery is prevented, and authentication accuracy of a living body is improved.

In order to achieve the above objects, the present invention is provided an authentication apparatus using image information, comprising: an image information reading unit reading in input image information; a feature information extraction unit extracting input feature information from the input image information read in by the image information reading unit; a verification unit verifying input feature information extracted by the feature information extraction unit and registered feature information registered in advance, and determining whether the input feature information matches the registered feature information; and a forgery distinction unit distinguishing that the input image information is by a forgery if the input feature information extracted by the feature information extraction unit has an almost radial uniform change for the registered feature information.

In such structure, the feature information of the forgery is characteristic information that the forgery has. For example, about a gummy finger made from gelatin, characteristic information is characteristics such as reduction by the passage of time. In another case, the feature information is information not shown in a living body such as expansion or a regular change according to materials. If the input feature information extracted in the feature information extraction unit matches or is similar to feature information of a forgery, whether a living body or a forgery can be determined when the input image information is determined to be by a forgery, high accurate authentication of a living body can be done, and the above objects can be achieved.

In order to achieve the above objects, in the authentication apparatus, preferably, the a forgery determination unit may determine to be a false finger if the input image information is input fingerprint image information and input feature information extracted from the input fingerprint image reduces uniformly, or, in the authentication apparatus, preferably, the a forgery determination unit may determine to be a false finger if the input image information is an input fingerprint image and input feature information extracted from the input fingerprint image reduces uniformly when the verification unit determines to be by an original person. From such structure, the above objects can be achieved.

In order to achieve the above objects, in the authentication apparatus, preferably, the input feature information and the registered feature information may be fingerprint feature point information, and the a forgery determination unit may calculate a rate that distances between input feature points and a center of fingerprints are shorter than distances between registered feature points corresponding thereto and the center of fingerprints concerning a plurality of matching feature points, and determines to be a false finger if the rate is larger than a predetermined threshold level, or in the authentication apparatus, preferably, the input feature information and the registered feature information may be fingerprint feature point information, and the a forgery determination unit may calculate a rate that distances between input feature points and the center of fingerprints are shorter than a predetermined ratio of distances between registered feature points corresponding thereto and the center of fingerprints concerning a plurality of matching feature points, and determines to be a false finger if the rate is larger than a predetermined threshold level. From such structure, the above objects can be achieved.

In order to achieve the above objects, in the authentication apparatus, preferably, the forgery determination unit may select the predetermined number of matching feature points in order of longer distance between matching feature points and the center of fingerprints, and calculates a rate used in a forgery determination from distances between the selected matching feature points and the center of fingerprints.

In order to achieve the above objects, in the authentication apparatus, preferably, the input feature information and the registered feature information may be fingerprint feature point information, and the a forgery determination unit may calculate a rate that distances between input matching feature points are shorter than distances between registered matching feature points corresponding thereto, and determines to be a false finger if the rate is larger than a predetermined threshold level, or, in the authentication apparatus, preferably, the input feature information and the registered feature information may be fingerprint feature point information, and the a forgery determination unit may calculate a rate that distances between input matching feature points are shorter than a predetermined ratio of distances between registered matching feature points corresponding thereto, and determines to be a false finger if the rate is larger than a predetermined threshold level.

In order to achieve the above objects, in the authentication apparatus, preferably, the forgery determination unit may select the predetermined number of pairs of matching feature points in order of longer distance between matching feature points, and calculates a rate used in a forgery determination from distances between the selected matching feature points.

In order to achieve the above objects, in the authentication apparatus, preferably, the forgery determination unit may determine to be a false finger if the rate calculated for the forgery determination is larger than the predetermined threshold level, and requests re-inputting if the rate is smaller than the threshold level and larger than a predetermined re-input threshold level.

In order to achieve the above objects, in the authentication apparatus, preferably, the forgery determination unit may verify expanded input feature information obtained by extraction of feature information after an input image expands in a plurality of powers with registered feature information, and determines to be a false finger when a degree of similarity obtained from the result is higher than a predetermined ratio to a degree of the similarity obtained at the verification unit.

In order to achieve the above objects, in the authentication apparatus, preferably, the forgery determination unit may verify the input feature information with reduced registered feature information obtained by extraction of feature information after an registered image reduces in a plurality of powers, and determines to be a false finger when a degree of similarity obtained from the result is higher than a predetermined ratio to a degree of the similarity obtained at the verification unit. From such structure, the above objects can be achieved.

In order to achieve the above objects, the authentication apparatus preferably may comprise a reduction feature information storing unit that stores reduced feature information reduced in a plurality of powers in advance.

In order to achieve the above objects, in the authentication apparatus, preferably, the forgery determination unit may determine to be a false finger if the calculated degree of the similarity is larger than a predetermined false finger threshold level, and requests re-inputting if the degree is smaller than the false finger threshold level and larger than a predetermined re-input threshold level.

In order to achieve the above objects, the present invention is provided with an authentication apparatus using bio information, comprising: a bio information reading unit reading in input bio information; a feature information extraction unit extracting input feature information from the input bio information read in by the bio information reading unit; a verification unit verifying input feature information extracted at the feature information extraction unit with registered feature information registered in advance, and determining whether the input feature information matches the registered feature information; and a forgery determination unit determining that the input bio information is by a forgery if the input feature information extracted at the feature information extraction unit has an almost radial uniform change for the registered feature information. From such structure, the above objects can be achieved.

In order to achieve the above objects, in the authentication apparatus, preferably, the input bio information may be input fingerprint image information, and the forgery determination unit may determine to be a forgery if the input feature information extracted from the input fingerprint image reduces uniformly.

In order to achieve the above objects, the present invention is provided an authentication method using image information, comprising: reading in input image information; extracting input feature information from the read in input image information, verifying the input feature information with registered feature information registered in advance, and determining whether the input feature information matches the registered feature information; and determining the input image information to be by a forgery if the input image feature information has an almost radial uniform change for the registered feature information. From such structure, the above objects can be achieved.

In order to achieve the above objects, the authentication method preferably may determine to be a false finger if the input feature information extracted from the input image information reduces uniformly.

In order to achieve the above objects, the present invention is provided an authentication method using bio information, comprising: reading in input bio information; extracting input feature information from the read in bio information; verifying the input feature information with registered feature information registered in advance, and determining whether the input feature information matches the registered feature information; and determining that the input bio information is a forgery if the input feature information has an almost radial uniform change for the registered feature information. From such structure, the above objects can be achieved.

In order to achieve the above objects, the authentication method preferably may determine to be a forgery if the input feature information extracted from the input bio information reduces uniformly.

In order to achieve the above objects, the present invention is provided a computer executable authentication program with using image information, the program comprising: reading in input image information; extracting input feature information from the read in input image information; verifying the input feature information with registered feature information registered in advance, and determining whether the input feature information matches the registered feature information; and determining the input image information to be a forgery if the input image information has an almost radial uniform change for the registered feature information. From such structure, the above objects can be achieved.

In order to achieve the above objects, the authentication program preferably may determine to be a false finger if the input feature information extracted from the input image information reduces uniformly.

In order to achieve the above objects, an authentication program is provided a computer executable authentication program with using bio information, the program comprising: reading in input bio information; extracting input feature information from the read in bio information; verifying the input feature information with registered feature information registered in advance, and determining whether the input feature information matches the registered feature information; and determining that if the input bio information is a forgery if the input feature information has an almost radial uniform change for the registered feature information. From such structure, the above objects can be achieved.

In order to achieve the above objects, in the authentication program preferably may determine to be a forgery if the input feature information extracted from the input bio information reduces uniformly.

In order to achieve the above objects, the present invention is provided an computer readable recording medium that records a computer executable authentication program with using image information, the program comprising: reading in input image information; extracting input feature information from the read in input image information; verifying the input feature information with registered feature information registered in advance, and determining whether the input feature information matches the registered feature information; and determining the input image information to be a forgery if the input image information has an almost radial uniform change for the registered feature information. From such structure, the above objects can be achieved.

In order to achieve the above objects, in the above recording medium, preferably, the program may comprise determining to be a false finger if the input feature information extracted from the input image information reduces uniformly.

In order to achieve the above objects, the present invention is provided an computer readable recording medium that records a computer executable authentication program with using image information, the program comprising: reading in input bio information; extracting input feature information from the read in bio information; verifying the input feature information with registered feature information registered in advance, and determining whether the input feature information matches the registered feature information; and determining that if the input bio information is a forgery if the input feature information has an almost radial uniform change to the registered feature information. From such structure, the above objects can be achieved.

In order to achieve the above objects, in the above recording medium, preferably, the program may comprise determining to be a forgery if the input feature information extracted from the input bio information reduces uniformly.

The followings listed are features and advantages of the present invention.

(1) Since whether input feature information matches or is similar to feature information that a forgery has is determined, whether a living body or a forgery can be accurately identified, and authentication accuracy of a living body can be improved.

(2) If a false finger is, for example, a gummy finger made from gelatin, the finger has characteristic of uniform reducing as time passes. With considering the feature of the false finger as feature, by using this, whether a living body or a forgery can be accurately determined, and authentication accuracy of a living body can be improved.

(3) Since whether a living body or a forgery is distinguished by obtaining feature information from a forgery, whether a living body or a forgery can be distinguished by information processing, accurate distinction whether a living body or a forgery can be done without necessity of dedicated hardware and with a simple mechanism, and authentication accuracy of a living body can be improved.

(4) If a processor such as a computer is mounted on an electronic device where an authentication apparatus is mounted, whether a living body or a forgery can be determined by using such processor in the authentication apparatus, thus authentication accuracy of a living body can be improved.

Other objects, features and advantages of the present invention are more clearly understood by referring to the attached drawings and each of the embodiments.

BRIEF DESCRIPTION OF DRAWINGS

FIG. 8 depicts a function block of a fingerprint authentication apparatus according to a second embodiment.

DESCRIPTION OF EMBODIMENTS

First Embodiment

Figure 1A:
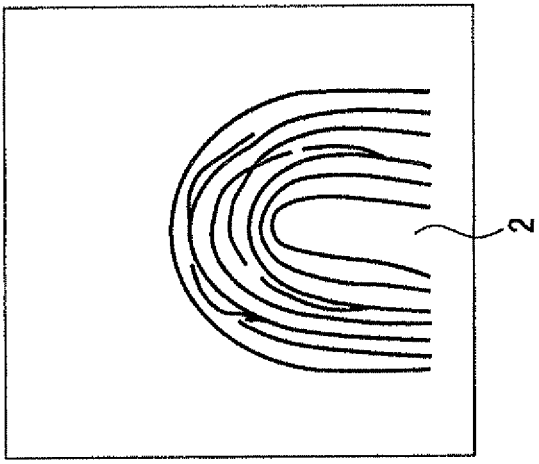
FIGS. 1A and 1B depict a process of deformation of a false finger according to a first embodiment.
Figure 1B:
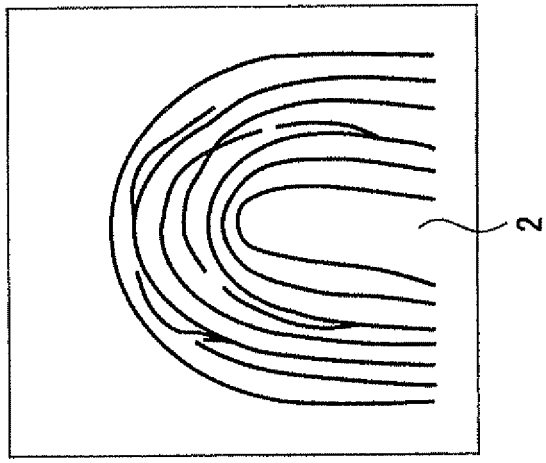

A first embodiment will now refer to FIGS. 1A and 1B. FIGS. 1A and 1B depict process of deformation of a false finger. Structure shown in FIGS. 1A and 1B are one example and the present invention is not limited to such structure.

In a fingerprint authentication apparatus according to this embodiment, used is characteristic that fingerprints of a false finger (non-living body, dummy finger) such as gummy fingerprints made from gelatin varies uniformly by the passage of time. Information that a distortion direction of the volume of feature varies uniformly is detected, and it is distinguished to be a false finger by the detected information.

A false finger 2 made from gelatin (a gummy finger) has the same form as a bio finger just after being made as shown in FIG. 1A. However, if some time passes, tendency appears in the form of the false finger 2 that a uniform change (reduction) occurs shown in FIG. 1B. This is the characteristic tendency that gelatin, a material of the false finger 2, has.

Concerning such tendency, for example, in the fingerprint authentication apparatus, the case may occur that distortion is generated in an input image by a factor such that an input way to a fingerprint sensor is not suitable. However, image distortion (input distortion) in this case has essential difference from uniform changing tendency in a reduction change of the false finger 2. A characteristic phenomenon of the false finger 2, for example, reducing in a distortion direction of the volume of feature uniformly does not appear in the image distortion.

Figure 2A:
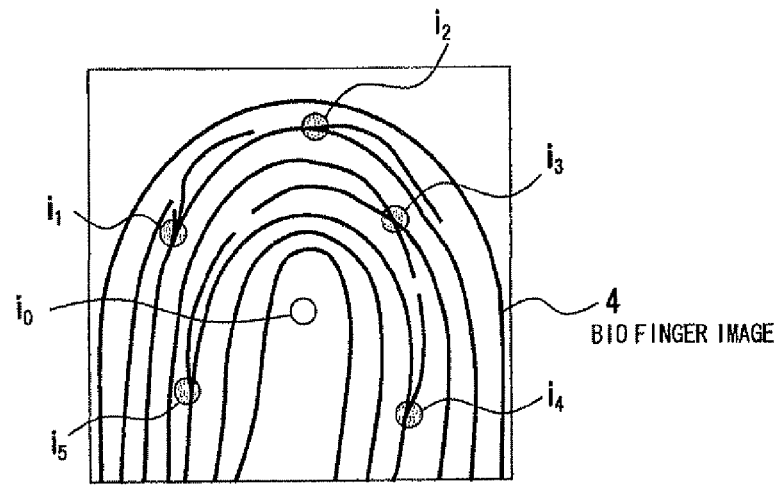
FIGS. 2A to 2C depict a change of feature points of a bio finger and a false finger.
Figure 2B:
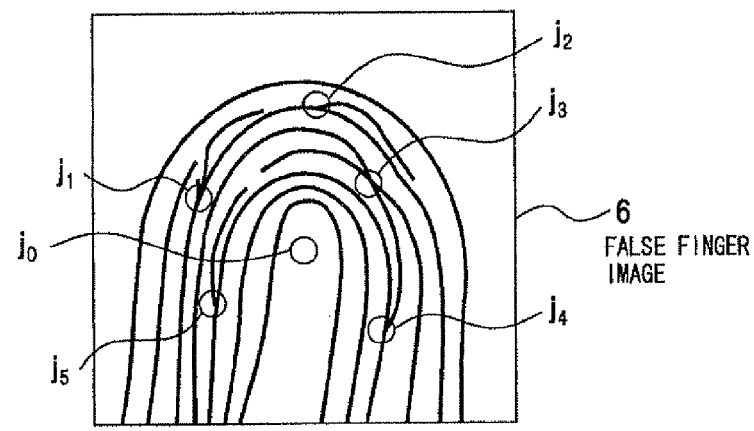
Figure 2C:
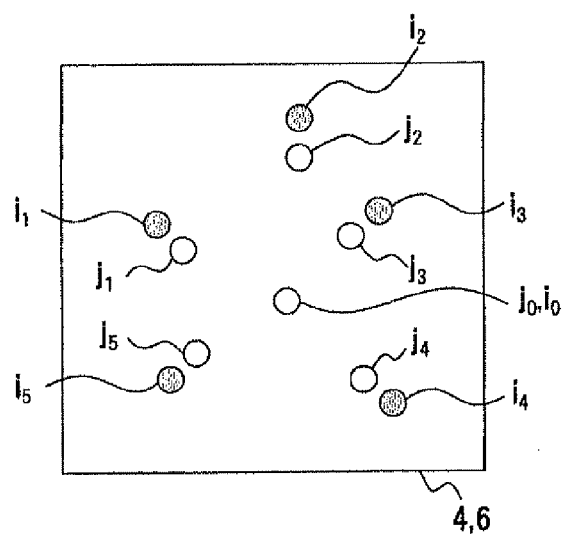
Figure 3A:
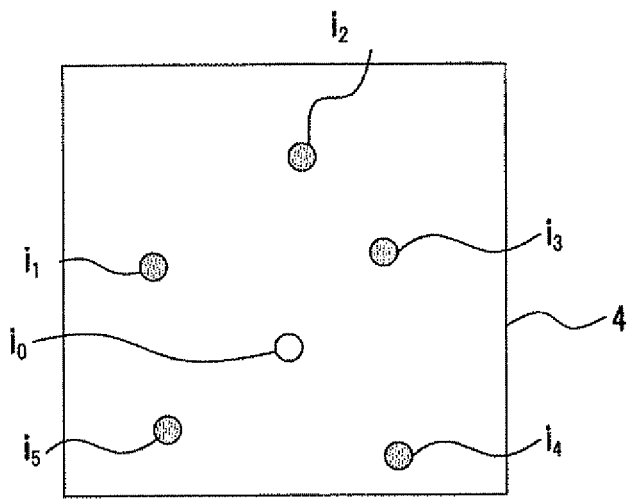
FIGS. 3A to 3C depict a change of feature points of a bio finger.
Figure 3B:
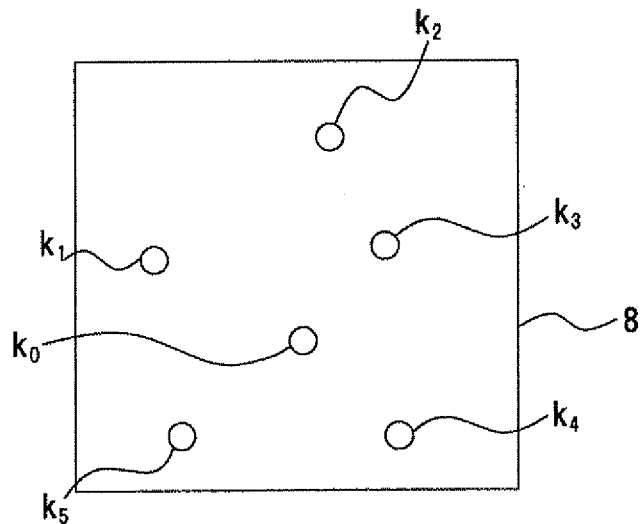
Figure 3C:
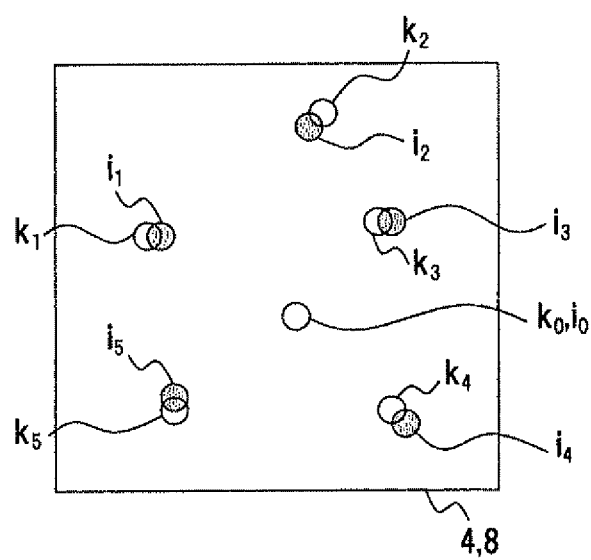

Concerning such change in a distortion direction of the false finger 2, FIGS. 2A to 2C and 3A to 3C will be referred. FIGS. 2A to 2C depict a change of feature points of a bio finger and a false finger, and FIGS. 3A to 3C depict a change of feature points of a bio finger. Structure shown in FIGS. 2A to 2C and 3A to 3C are one example and the present invention is not limited to such structure.

A bio finger image 4 (FIG. 2A) is an image read out from a bio finger. A false finger image 6 (FIG. 2B) is an image read out from the false finger 2 (FIG. 1B) made from gelatin when time passes since being made. Since the false finger 2 copies a bio finger, relationship between these bio finger image 4 and false finger image 6 is similarity. As shown in FIG. 2A, feature points $i_1$, $i_2$, $i_3$, $i_4$ and $i_5$ are extracted from the bio finger image 4, and as shown in FIG. 2B, feature points $j_1$, $j_2$, $j_3$, $j_4$ and $j_5$ are extracted from the false finger image 6. If these bio finger image 4 and false finger image 6 are superimposed with adjusting their positions at a position of $i_0$ and $j_0$ of the center of fingerprints as shown in FIG. 2C, each of the feature point $i_1$ to $i_5$ and each of the feature point $j_1$ to $j_5$ are matching feature points respectively. The feature points $j_1$, $j_2$, $j_3$, $j_4$ and $j_5$ of the false finger image 6 are inside the feature points $i_1$, $i_2$, $i_3$, $i_4$ and $i_5$ of the bio finger image 4, so declining directions are uniform.

Concerning two bio finger image 4 (FIG. 3A) and bio finger image 8 (FIG. 3B) read out from the same bio finger, it is supposed that image distortion occurs in the bio finger image 8 different from the bio finger image 4. As feature points, as shown in FIG. 3A, the first feature points $i_1$, $i_2$, $i_3$, $i_4$ and $i_5$ are extracted from the bio finger image 4, and as shown in FIG. 3B, a second feature points $k_1$, $k_2$, $k_3$, $k_4$ and $k_5$ are extracted from the bio finger image 8. If these bio finger images 4 and 8 are superimposed with adjusting their positions at a position of $i_0$ and $k_0$ of the center of fingerprints as shown in FIG. 3C, each of the feature point $i_1$ to $i_5$ and each of the feature points $k_1$ to $k_5$ are matching feature points. In the feature points $i_1$, $i_2$, $i_3$, $i_4$ and $i_5$, and the feature points $k_1$, $k_2$, $k_3$, $k_4$ and $k_5$ obtained from the bio finger images 4 and 8, declining directions are not uniform.

Different points as follows appear in the feature points of the false finger 2 (FIG. 1) as compared with a bio finger.

(1) Length of Distances Between the Center of Fingerprints and Feature Points

Figure 4:
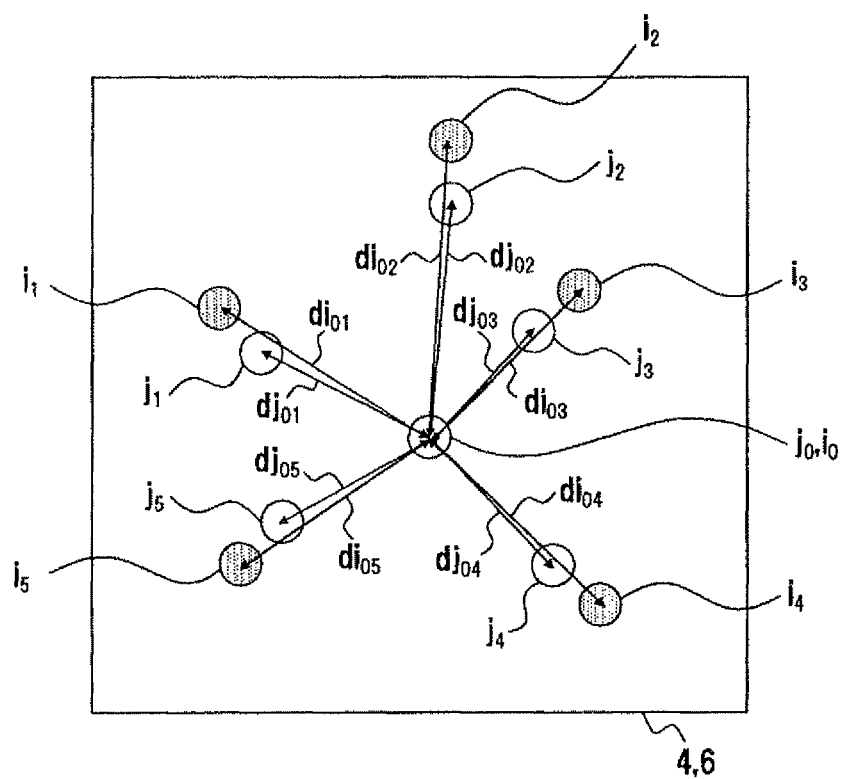
FIG. 4 depicts a superimposed image where a bio finger image and a false finger image are superimposed.
Figure 5:
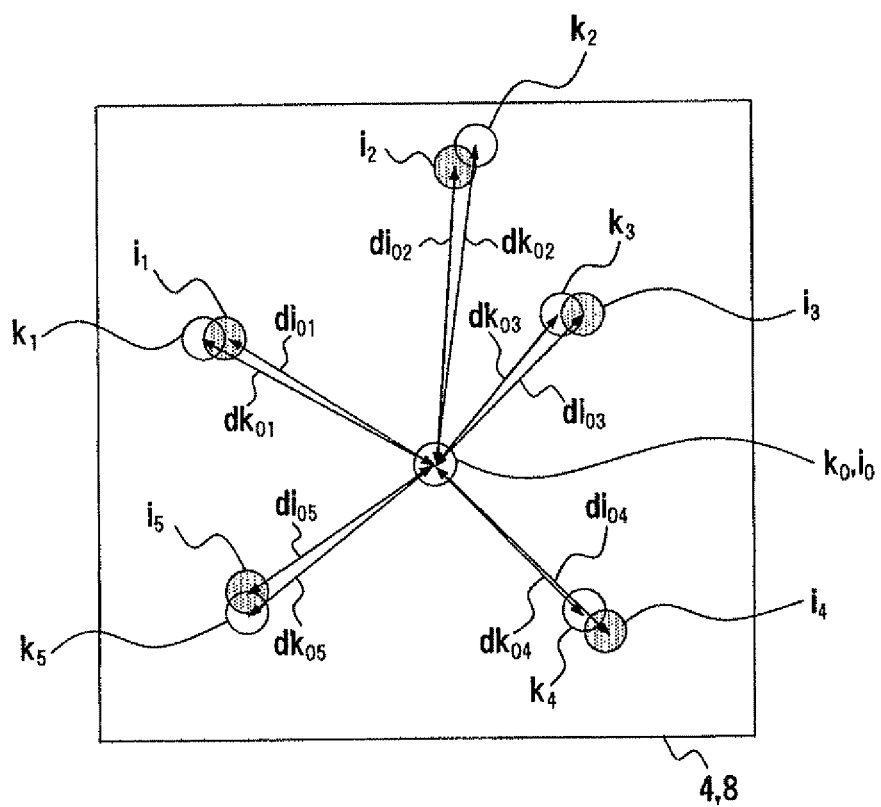
FIG. 5 depicts a superimposed image where two bio finger images are superimposed.

FIG. 4 depicts a superimposed image where a bio finger image and a false finger image are superimposed correspondingly to FIG. 2C, and FIG. 5 depicts a superimposed image where two bio finger images are superimposed correspondingly to FIG. 3C. As shown in FIG. 4, if distances from the center of fingerprints of the bio finger, $i_0$ to each of the feature points $i_1$, $i_2$, $i_3$, $i_4$ and $i_5$ be $i_0-i_1=di_{01}$, $i_0-i_2=di_{02}$, $i_0-i_3=di_{03}$, $i_0-i_4=di_{04}$ and $i_0-i_5=di_{05}$, and if distances from the center of fingerprints of the false finger 2, j0 to each of the feature points $j_1$, $j_2$, $j_3$, $j_4$ and $j_5$ be $j_0-j_1=dj_{01}$, $j_0-j_2=dj_{02}$, $j_0-j_3=dj_{03}$, $j_0-j_4=dj_{04}$ and $j_0-j_5=dj_{05}$, $di_{01}>dj_{01}$, $di_{02}>dj_{02}$, $di_{03}>dj_{03}$, $di_{04}>dj_{04}$ and $di_{05}>dj_{05}$.

Concerning the first feature points, as shown in FIG. 5, the distances from the center of fingerprints $i_0$ to each of the feature points $i_1$, $i_2$, $i_3$, $i_4$ and $i_5$ is $i_0-i_1=di_{01}$, $i_0-i_2=di_{02}$, $i_0-i_3=di_{03}$, $i_0-i_4=di_{04}$ and $i_0-i_5=di_{05}$ as described above. On the other hands, concerning the second feature points, if distances from the center of fingerprints $k_0$ to each of the feature points $k_1$, $k_2$, $k_3$, $k_4$ and $k_5$ be $k_0-k_1=dk_{01}$, $k_0-k_2=dk_{02}$, $k_0-k_3=dk_{03}$, $k_0-k_4=dk_{04}$ and $k_0-k_5=dk_{05}$, $di_{01}<dk_{01}$, $di_{02}<dk_{02}$, $di_{03}>dk_{03}$, $di_{04}>dk_{04}$ and $di_{05}<dk_{05}$. There are long and short distances between the center of fingerprints and the feature points. The above tendency is different from uniform reduction of a false finger.

That is, concerning the distances from the center of fingerprints to the feature points, and the distances in the false finger, $j_0-j_1$, $j_0-j_2$, $j_0-j_3$, $j_0-j_4$ and $j_0-j_5$ are shorter than the distances of the bio finger, $i_0$-$i_1$, $i_0$-$i_2$, $i_0$-$i_3$, $i_0$-$i_4$ and $i_0$-$i_5$. However, in the bio finger images 4 and 8 (FIG. 3C), both short and long distances exist.

(2) Length of Distance Between the Feature Points

Figure 6:
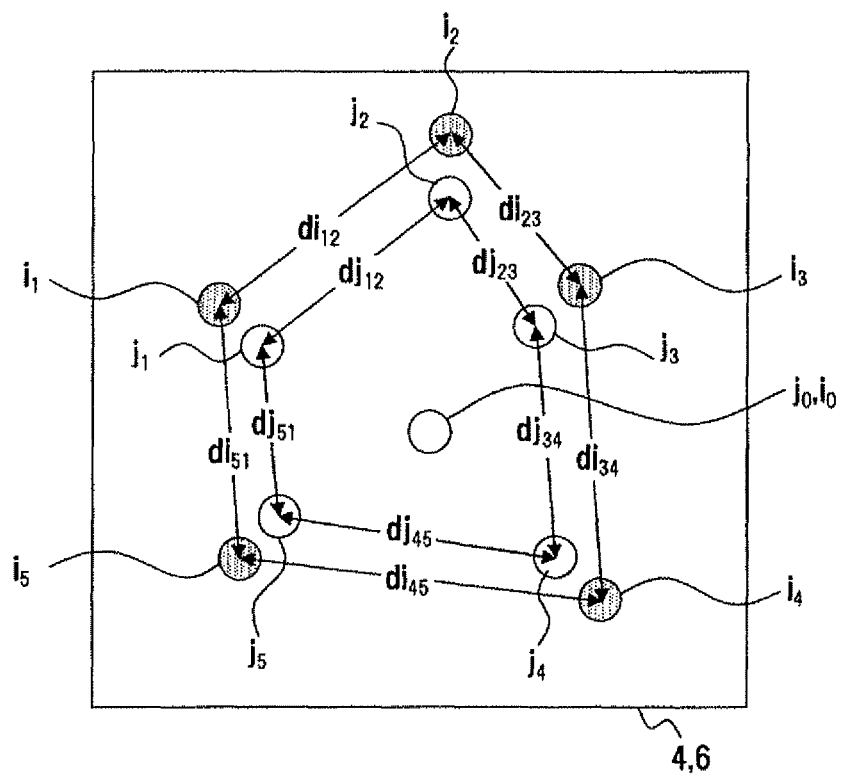
FIG. 6 depicts a superimposed image where a bio finger image and a false finger image are superimposed.

FIG. 6 depicts a superimposed image where a bio finger image and a false finger image are superimposed. If distances between the feature points of the bio finger be $i_1$-$i_2$=$di_{12}$, $i_2$-$i_3$=$di_{23}$, $i_3$-$i_4$=$di_{34}$, $i_4$-$i_5$=$di_{45}$ and $i_5$-$i_1$=$di_{51}$, and if distance between the feature points of the false finger 2 be $j_1$-$j_2$=$dj_{12}$, $j_2$-$j_3$=$dj_{23}$, $j_3$-$j_4$=$dj_{34}$, $j_4$-$j_5$=$dj_{45}$ and $j_5$-$j_1$=$dj_{51}$, $di_{12}$>$dj_{12}$, $di_{23}$>$dj_{23}$, $di_{34}$>$dj_{34}$, $di_{45}$>$dj_{45}$ and $di_{51}$>$dj_{51}$. Thus, all the distances between the feature points of the false finger image 6 become shorter than the corresponding distances between the feature points of the bio finger image 4.

(3) Matching Degree of Feature Points

Figure 7A:
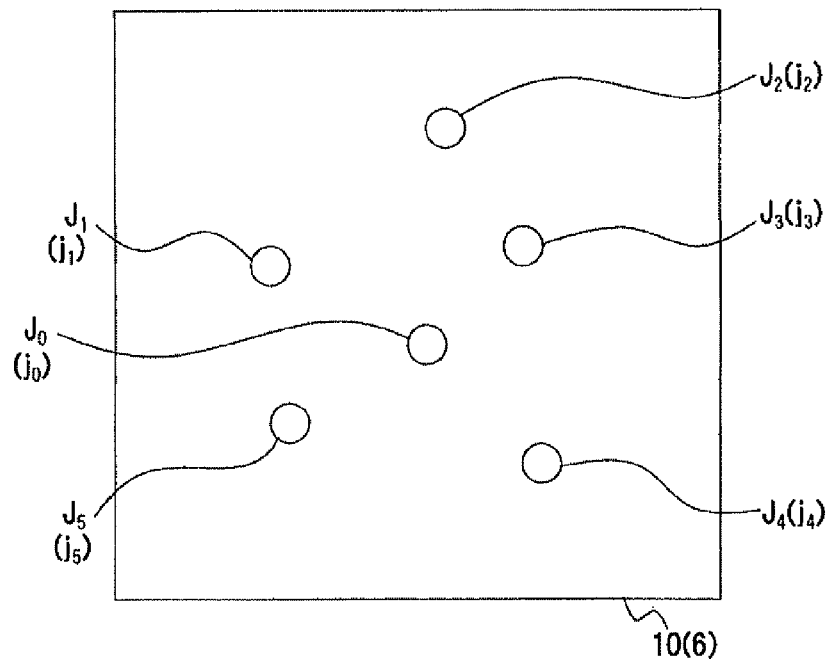
FIGS. 7A and 7B depict a false finger image.
Figure 7B:
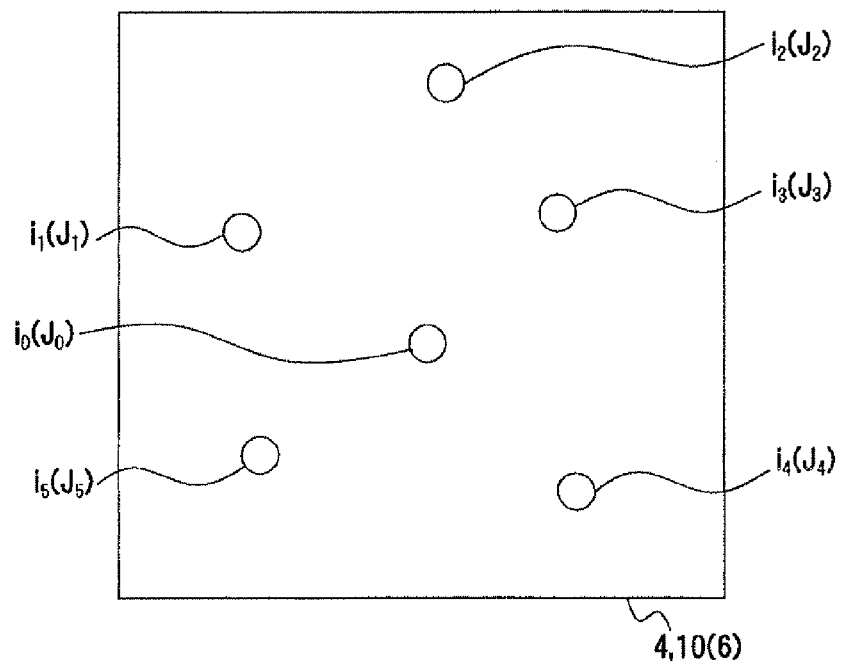

Determination of matching degree of feature points will now refer to FIGS. 7A and 7B. FIGS. 7A and 7B depict a false finger image of the false finger (FIG. 1).

An expanded false finger image 10 shown in FIG. 7A is an image that the false finger image 6 (FIG. 2B) that is obtained from the false finger 2 (FIG. 1) is expanded at an expansion rate n (%) according to a reduction rate n (%) of the false finger 2 (FIG. 1) as compared with the reduction rate n (%) of the false finger 2 (FIG. 1).

In the case where the bio finger image 4 is verified with the false finger image 6 (FIG. 2C), as compared with a matching degree between each feature points $i_1$:$j_1$, $i_2$:$j_2$, $i_3$:$j_3$, $i_4$:$j_4$ and $i_5$:$j_5$ when the bio finger image 4 are compared with the false finger image 6 with powers of the false finger image 6 remaining, as shown in FIG. 7B, if the expanded false finger image 10 is superimposed on the bio finger image 4, almost all the feature points match. Thus, if the bio finger image 4 and the false finger image 6 are verified, the matching degree of the expanded false finger image 10, which expands according to the reduction rate of the false finger 2, and the bio finger image 4 enhances more than that of the false finger image 6, which remains at the reduction rate of the false finger 2 and the bio finger image 4. $J_1$, $J_2$, $J_3$, $J_4$ and $J_5$ show the feature points in the expanded false finger image 10.

(4) Tendency Occurring to Obtained Image Distortion

When an image is inputted from a seeping typed fingerprint sensor, the bio finger image 6 may distort. In this case, distortion in a lateral direction does not appear. Distortion appears such as non-uniform distortion in upward and downward directions. Such distortion does not appear as the false finger image 6 and the bio finger image 4 being compared.

By referring any one or a plurality of such singular tendency, whether a false finger or a bio finger can be distinguished Biometric authentication will now refer to FIG. 8. FIG. 8 depicts a function block of a fingerprint authentication apparatus. Structure shown in FIG. 8 is one example and the present invention is not limited to such structure.

This fingerprint authentication apparatus 12 is one example of a biometric authentication apparatus using fingerprints for biometric authentication. The fingerprint authentication apparatus 12 includes a fingerprint image reading unit 14, a feature data extraction unit 16, a verification unit 18, a feature data storing unit 20 and a forgery distinction unit 22.

The fingerprint image reading unit 14 is a means for reading a fingerprint image from fingerprints, and is configured of, for example a sweeping typed fingerprint sensor.

The feature data extraction unit 16 is a means for extracting feature data as feature information from a fingerprint image as image information picked by the fingerprint image reading unit 14.

The verification unit 18 is a means for verifying feature data extracted from a fingerprint image by the feature data extraction unit 16 with registered feature data registered in the feature data storing unit 20 in advance. As known methods about this verification, there are a feature points method and a pattern matching method, etc.

The feature data storing unit 20 is a means for storing personal registered feature data.

The a forgery distinction unit 22 compares input feature data and registered feature data, determines whether the input feature data is by the false finger 2 (FIG. 1), and determines that a read fingerprint image is by the false finger 2 (FIG. 1) in case, for example, the input feature data varies (reduces) uniformly.

Figure 9:
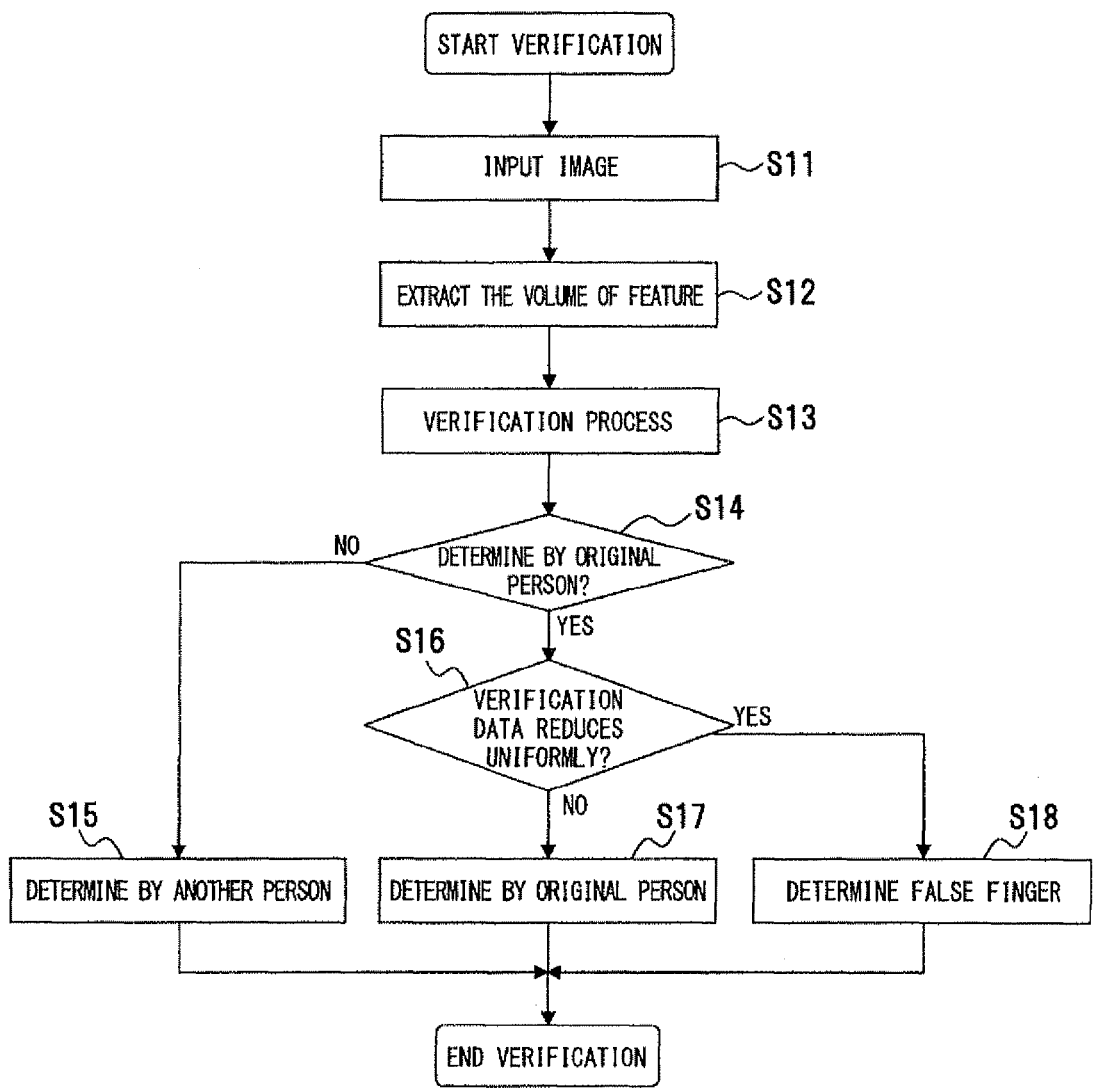
FIG. 9 is a flowchart showing one example of processing procedure of verification.
Figure 10:
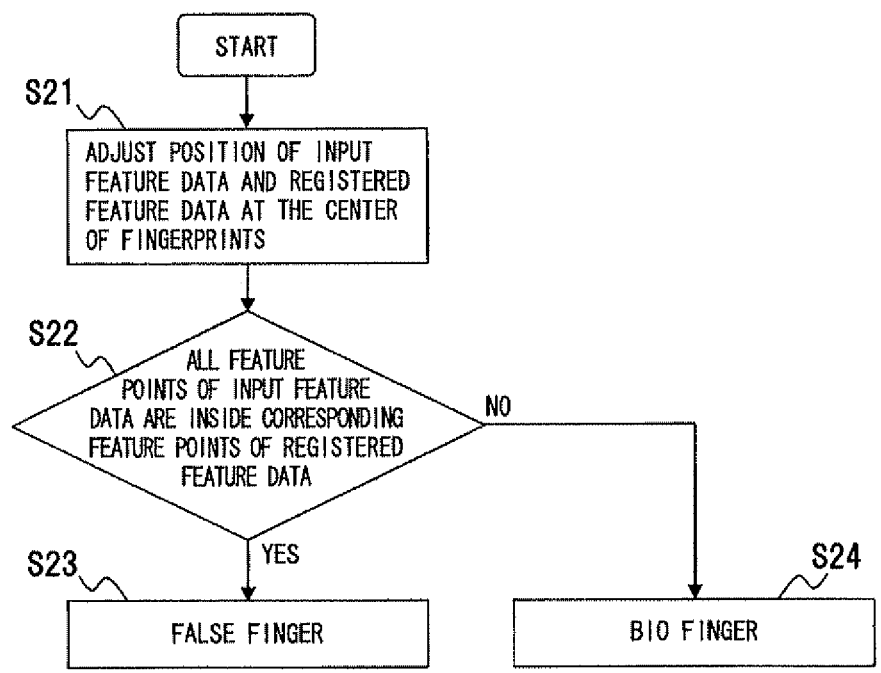
FIG. 10 is a flowchart showing a subroutine for determining reduction of verification data.

A verification process of biometric authentication will now refer to FIGS. 9 and 10. FIG. 9 is a flowchart showing one example of processing procedure of verification and FIG. 10 is a flowchart showing a subroutine for determining reduction of verification data. Structure shown in FIGS. 9 and 10 are one example and the present invention is not limited to such structure.

This processing procedure is one example of an authentication method and an authentication program, and includes a determination process in case where verification data reduces uniformly. Any one or more of the singular points described above may be used for the determination of reduction, the singular points being (1) length of distances between the center of fingerprints and the feature points, (2) length of distance between the feature points, (3) matching degree of the feature points and (4) tendency occurring to obtained image distortion.

A verification process is started by an event such as turning power on. A fingerprint image is input by the fingerprint image reading unit 14 (step S11). After reading the fingerprint image, the volume of feature is extracted from the fingerprint image (step S12). Feature data is extracted by the extraction of the volume of feature. The extracted feature data is input feature data. The input feature data is verified with registered feature data by a verification process in the verification unit 18 (step S13). The registered feature data is registered in the feature data storage unit 20 in advance, and is read out from the feature data storage unit 20 when verification. Based on the verification process, whether the input feature data is by an original person or not is determined (step S14). If the input feature data cannot be determined to be by an original person (NO of step S14) it is determined to be another person (step S15), and the verification process is ended.

If the input feature data can be determined to be by an original person (YES of step S14), a forgery determination process by the forgery distinction unit 22 is implemented. In this case, it is determined whether verification data, that is, input feature data reduces uniformly (step S16). If the data does not reduce uniformly (NO of step S16), it is determined to be by an original person (step S17) and the verification process is ended.

If the input feature data reduces uniformly, it is determined to be a false finger (step S18) and the verification process is ended.

Determination whether the input feature data reduces uniformly (step S16) will now refer to FIG. 10. The input feature data and registered feature data are adjusted of their positions at the center of fingerprints (step S21). It is determined whether all of the feature points of the input feature data are inside corresponding feature points of the registered feature data (step S22). If all of the feature points of the input feature data are inside the corresponding feature points of the registered feature data (YES of step S22), it is determined to be a false finger (step S23=step S18), and unless they are inside the corresponding feature points of the registered feature data (NO of step S22), it is determined to be a bio finger (step S24). Then, the process is ended and returns to a main routine.

Figure 11:
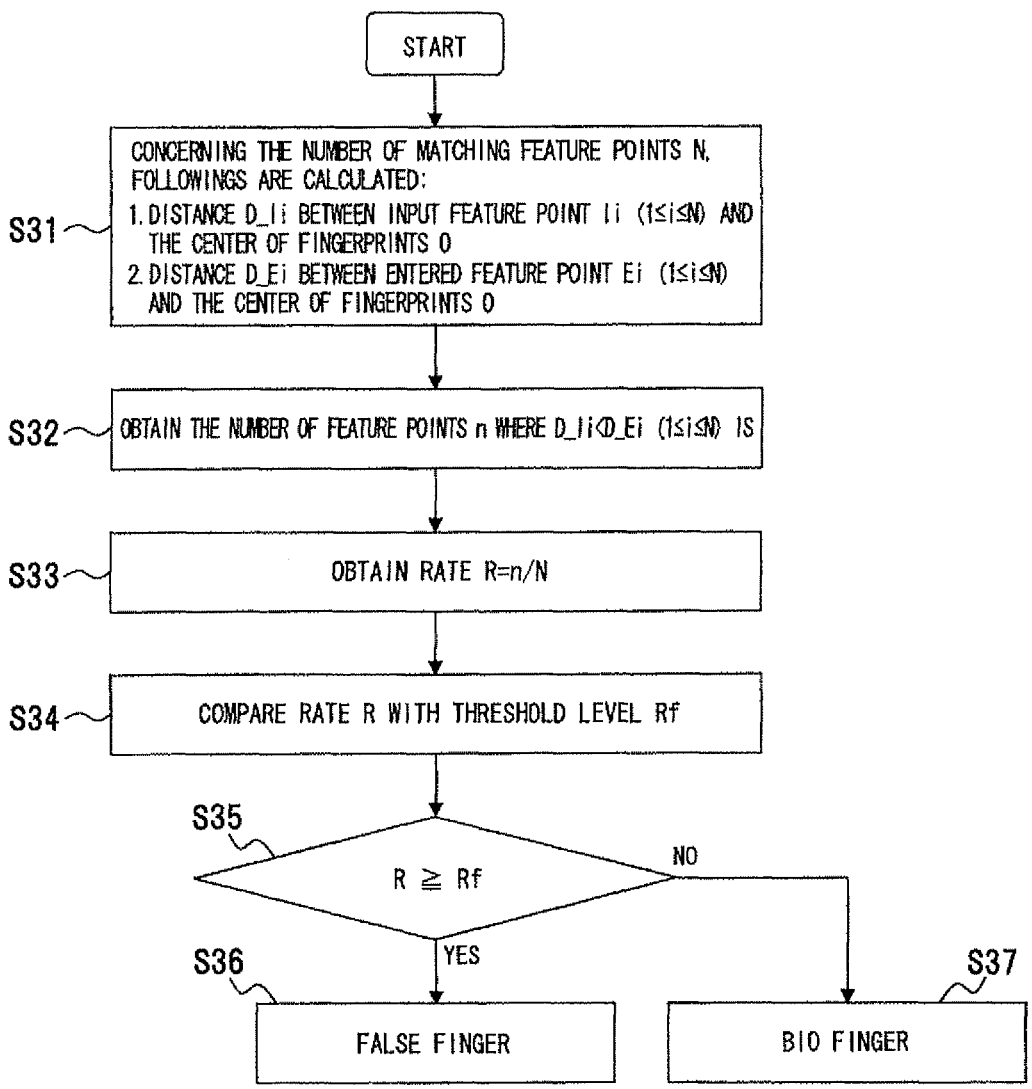
FIG. 11 is a flowchart showing a subroutine for determining a false finger.

A determination process of a false finger will now refer to FIG. 11. FIG. 11 is a flowchart showing a subroutine for determining a false finger. Structure shown in FIG. 11 is one example and the present invention is not limited to such structure.

When input feature data is an gummy finger, as shown in FIG. 2C, the input feature data reduces uniformly. Thus, if the input feature data is positioned with registered feature data at the center of fingerprints $i_0$ and $j_0$, all of the feature points of the input feature data of the false finger 2 are inside corresponding feature points of the registered feature data.

As shown in FIG. 4, distances between the center of fingerprints of the false finger 2, j0 and each of the feature points $j_1, j_2, j_3, j_4$ and $j_5$ are $dj_{01} (=j_0-j_1)$, $dj_{02} (=j_0-j_2)$, $dj_{03} (=j_0-j_3)$, $dj_{04} (=j_0-j_4)$ and $dj_{05} (=j_0-j_5)$.

And, as shown in FIG. 4, feature point of the registered feature data are supposed to be $i_1, i_2, i_3, i_4$ and $i_5$, and distances between the center of fingerprints of the bio finger i0 and $i_1, i_2, i_3, i_4$ and $i_5$ are supposed to be $di_{01} (=i_0-i_1)$, $di_{02} (=i_0-i_2)$, $di_{03} (=i_0-i_3)$, $di_{04} (=i_0-i_4)$ and $di_{05} (=i_0-i_5)$.

In this case, magnitude of distances between each of the center of fingerprints and each of the feature points are $di_{01}>dj_{01}$, $di_{02}>dj_{02}$, $di_{03}>dj_{03}$, $di_{04}>dj_{04}$ and $di_{05}>dj_{05}$. As compared with the number of matching feature points N, the distances of the number of the feature points n=5 become short, and a rate that the distances thereof are shorter than the distances from the center of fingerprints is R=5/N (=5), that is, 1 (=100%).

This forgery determination is one example of an authentication method or an authentication program. A process is used that after matching feature points are obtained, the above described (1) length of distances between the center of fingerprints and feature points (FIG. 4) is obtained. That is, in the processing procedure, a plurality of matching feature points are detected, distances between input feature points and the center of fingerprints are calculated concerning a plurality of the matching feature points (=step S31), a rate that the distances between input feature points and the center of fingerprints are shorter than distances between corresponding registered feature points and the center of fingerprints are calculated (=steps S32 and S33), it is determined whether the rate is larger than a predetermined threshold level (=steps S34 and S35), if larger (=YES of step S35), it is determined to be a false finger (=step S36) and if smaller (=NO of step S35), it is determined to be a bio finger (=step S37) and the process is ended.

In this processing procedure, as shown in FIG. 11, concerning the number of matching feature points N, calculated are followings (step S31). That is, "1. Distance between an input feature point Ii ($1 \leq i \leq N$) and the center of fingerprints O, D_Ii"

"2. Distance between a registered feature point Ei ($1 \leq i \leq N$) and the center of fingerprints O, D_Ei".

The input feature point Ii is the above described input feature data, and the registered feature point Ei is the registered feature data. The center of fingerprints O is the same as the above described center of fingerprints, $i_0$ and $j_0$.

After the calculation of the distance between the input feature point or the registered feature point, and the center of fingerprints, the number of the feature points n which are D_Ii<D_Ei ($1 \leq i \leq N$) are obtained (step S32). Here, D_Ii≦D_Ei ($1 \leq i \leq N$) represents the case where the distance D_Ii is shorter than the distance D_Ei.

A rate of the number of the feature points n per the number of matching feature points N, R=n/N is obtained (step S33), the rate R and a threshold level Rf are compared (step S34) and whether the rate R is not less than the threshold level Rf (R≧Rf) is determined (step S35).

If R≧Rf (YES of step S35), it is determined to be a false finger (step S36) and if R<Rf (NO of step S35), it is determined to be a bio finger (step S37) and the process is ended.

Figure 12:
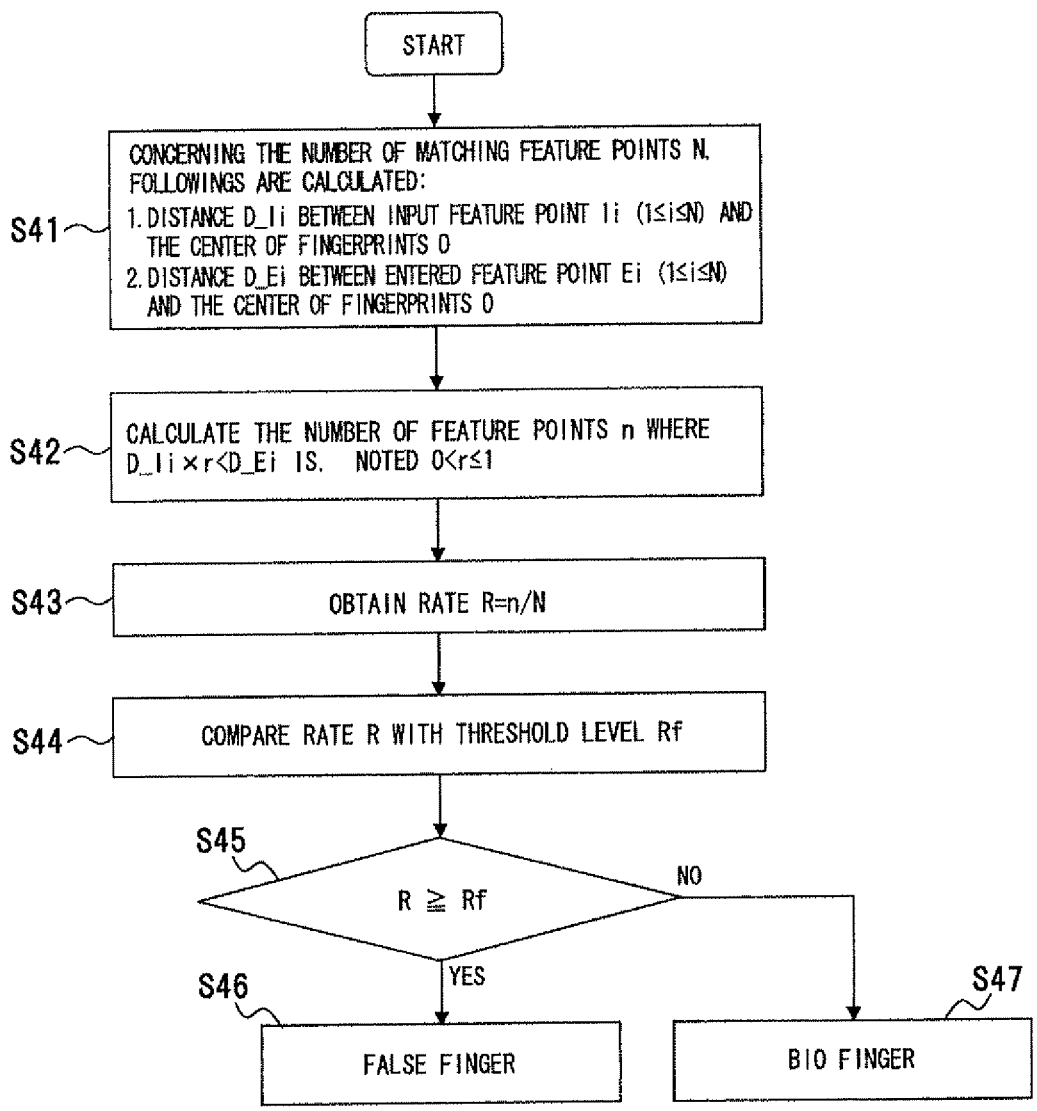
FIG. 12 is a flowchart showing another subroutine for determining a false finger.

A subroutine for the determination of a false finger will now refer to FIG. 12. FIG. 12 is a flowchart showing another subroutine for determining a false finger. Structure shown in FIG. 12 is one example and the present invention is not limited to such structure.

In the subroutine for determining a false finger shown in FIG. 11, the number of the feature point n where D_Ii<D_Ei ($1 \leq i \leq N$) is. As shown in FIG. 12, the number of the feature point n where D_Ii*r<D_Ei is may be calculated. Noted that $o<r \leq 1$.

In this processing procedure, a plurality of matching feature points are detected, distances between the input feature points and the center of fingerprints are calculated in response to a plurality of the matching feature points (=step S41), a rate smaller than a predetermined ratio (=r) of distance between the input feature points and the center of fingerprints per the distances between corresponding registered feature points and the center of fingerprints is calculated (=steps S42 and S43), it is determined whether the rate is larger than a predetermined threshold level (=steps S44 and S45), if larger (=YES of step S45), it is determined to be a false finger (=step S46) and if smaller (=NO of step S45), it is determined to be a bio finger (=step S47) and the process id ended. In this processing procedure, the fingerprint authentication apparatus 12 shown in FIG. 8 and the processing procedure shown in FIG. 9 are used.

In this processing procedure, as shown in FIG. 12, concerning the number of matching feature points N, calculated are followings (step S41). That is, "Distance between an input feature point Ii ($1 \leq i \leq N$) and the center of fingerprints O, D_Ii" and "Distance between a registered feature point Ei ($1 \leq i \leq N$) and the center of fingerprints O, D_Ei".

The input feature point Ii is the above described input feature data, and the registered feature point Ei is the registered feature data. The center of fingerprints O is the same as the above described center of fingerprints, $i_0$ and $j_0$.

After the calculation of the distance between the input feature point or the registered feature point, and the center of fingerprints, the number of the feature points n where D_Ii*r<D_Ei is are calculated (step S42). Noted that $o<r \leq 1$.

After this calculation, a rate of the number of feature points n per the number of matching feature points N, R=n/N is calculated (step S43), the rate R and a threshold level Rf are compared (step S44) and whether the rate R is not less than the threshold level RE (R≧Rf) is determined (step S45).

If R≧Rf (YES of step S45), it is determined to be a false finger (step S46) and if R<Rf (NO of step S45), it is determined to be a bio finger (step S47).

In this determination, a rate smaller than a predetermined ratio in advance of distances between the input feature points and the center of fingerprints, per distances between the corresponding registered feature points and the center of fingerprints is calculated, then it is determined to be a false finger if the rate is larger than the predetermined threshold level. Therefore, determination with consideration of distortion of an image can be performed and a determination error by distortion of an image can be reduced.

Second Embodiment

Figure 13:
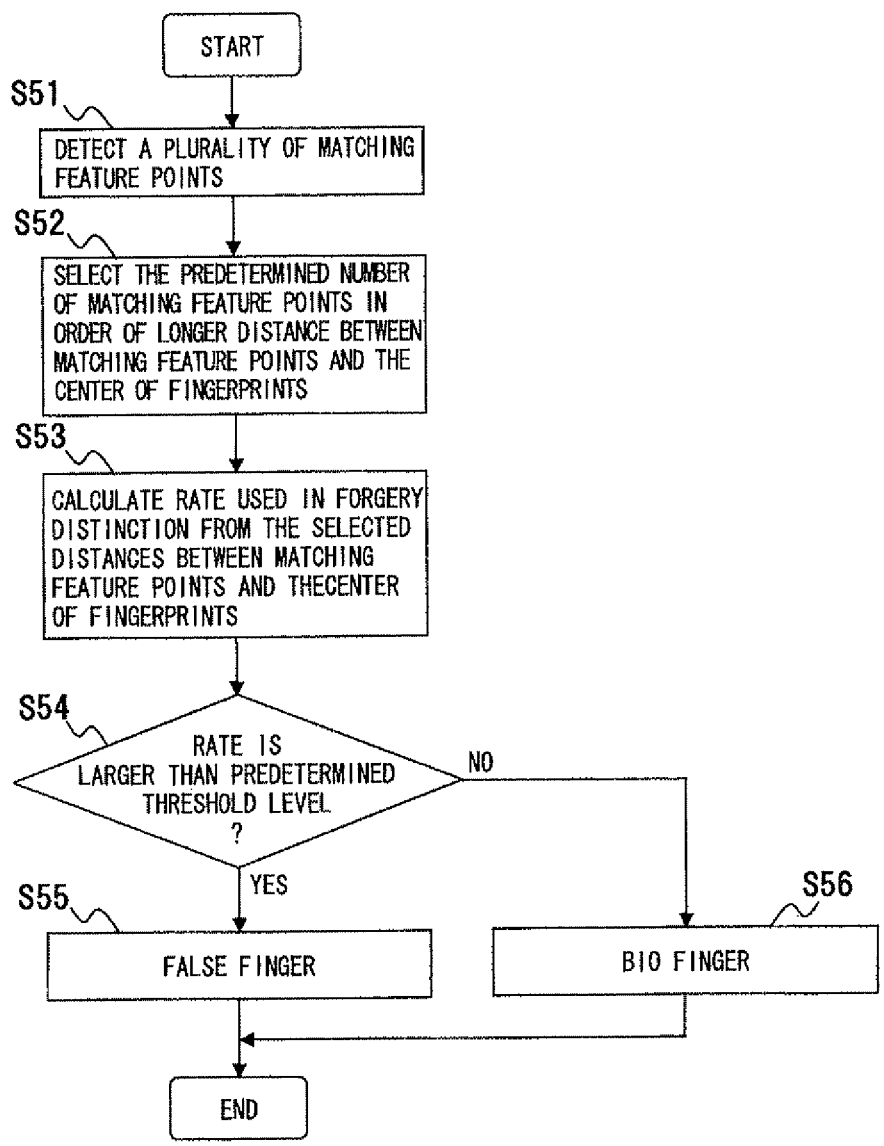
FIG. 13 is a flowchart showing one example of processing procedure of verification.

A second embodiment will now refer to FIG. 13. FIG. 13 is a flowchart showing one example of processing procedure of verification. Structure shown in FIG. 13 is one example and the present invention is not limited to such structure.

This processing procedure is a determination process of avoiding affection of distortion of an image in case where distances between matching feature points and the center of fingerprints are shorter. If distances between matching feature points and the center of fingerprints are shorter, affection of distortion of an image becomes bigger. Thus, the predetermined number of matching feature points are selected in order of longer distance between matching feature points and the center of fingerprints. A rate used in a forgery distinction may be calculated from the selected distance between matching feature points and the center of fingerprints. In the embodiment, as is the same as the first embodiment, the fingerprint authentication apparatus 12 shown in FIG. 8 and the processing procedure shown in FIG. 9 are used.

In this processing procedure, as shown in FIG. 13, a plurality of matching feature points are detected (step S51), among the plurality of matching future points, the predetermined number of matching feature points are selected in order of longer distance between matching feature points and the center of fingerprints (step S52), a rate used in a forgery determination is calculated from the selected distances between matching feature points and the center of fingerprints (step S53), whether the rate is larger than the predetermined threshold level is determined (step S54), if larger (YES of step S54), it is determined to be a false finger (step S55) and if smaller (NO of step S54), it is determined to be a bio finger (step S56), and the process is ended.

According to such processing procedure, determination whether a bio finger or a false finger can be made with avoiding influence of image distortion, thus, high accurate authentication can be processed.

Third Embodiment

Figure 14:
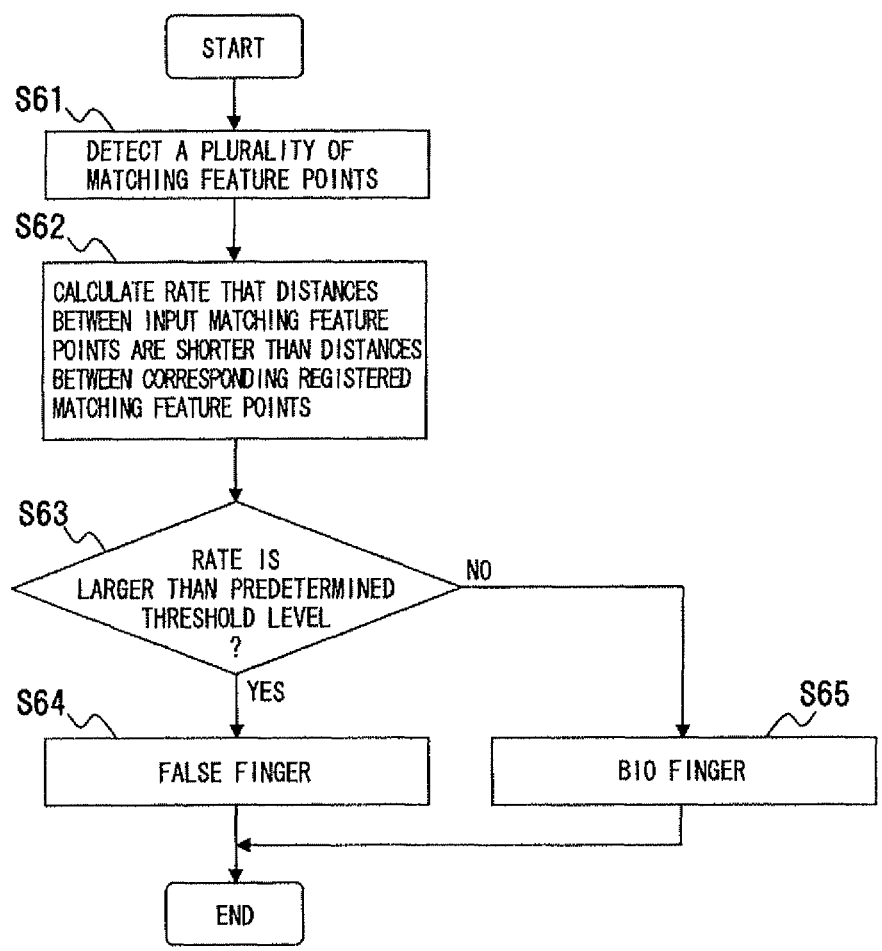
FIG. 14 is a flowchart showing one example of processing procedure of verification according to a third embodiment.

A third embodiment will now refer to FIG. 14. FIG. 14 is a flowchart showing one example of processing procedure of verification. Structure shown in FIG. 14 is one example and the present invention is not limited to such structure.

In this third embodiment, a determination process is by distances between feature points. That is, the distances between feature points can be used as shown in FIG. 4 along with distances between feature points and the center of fingerprints in determination of the false finger 2 that reduces uniformly. It can be distinguished to be a false finger when a rate that distance between input matching feature points is shorter than distance between corresponding registered matching feature points, and the rate is larger than a predetermine threshold level.

As shown in FIG. 6, toward the distances between the registered feature points of the living body, $di_{12}$ ($=i_1-i_2$), $di_{23}$ ($=i_2-i_3$), $di_{34}$ ($=i_3-i_4$) $di_{45}$ ($=i_4-i_5$) and $di_{51}$ ($=i_5-i_1$), if the distances between the feature points of the false finger 2 is supported to be $dj_{12}$ ($=j_1-j_2$), $dj_{23}$ ($=j_2-j_3$), $dj_{34}$ ($=j_3-j_4$), $dj_{45}$ ($=j_4-j_5$) and $dj_{51}$ ($=j_5-j_1$), $di_{12}>dj_{12}$, $di_{23}>dj_{23}$, $di_{34}>dj_{34}$, $di_{45}>dj_{45}$ and $di_{51}>dj_{51}$.

In this case, toward the number of the matching feature points N, if the number of shorter feature points is n, a rate R of shorter distance is R=n/N. Where a threshold level of the rate R is Rf, it can be determined to be a false finger when the rate R is over the threshold level Rf.

Then, in this processing procedure, as shown in FIG. 14, a plurality of matching feature points are detected (step S61), concerning the plurality of the matching feature points, a rate that the distances between the input matching feature points are shorter than the distances between the corresponding registered matching feature points is calculated (step S62), whether the rate is larger than a predetermined threshold level is determined (step S63), if larger (YES of step S63), it is determined to be a false finger (step S64) and if smaller (NO of step S63), it is determined to be a bio finger (step S65), and the process is ended. In this embodiment, as is the same as the first embodiment, the fingerprint authentication apparatus 12 shown in FIG. 8 and the processing procedure shown in FIG. 9 are used.

According to such determination process, by calculating a rate that distances between the input matching feature points are shorter than distances between the corresponding registered matching feature points to distinguish to be a false finger if the rate is larger than a predetermined threshold level, whether a bio finger or a false finger can be determined with avoiding influence of image distortion, thus, high accurate authentication can be processed.

Figure 15:
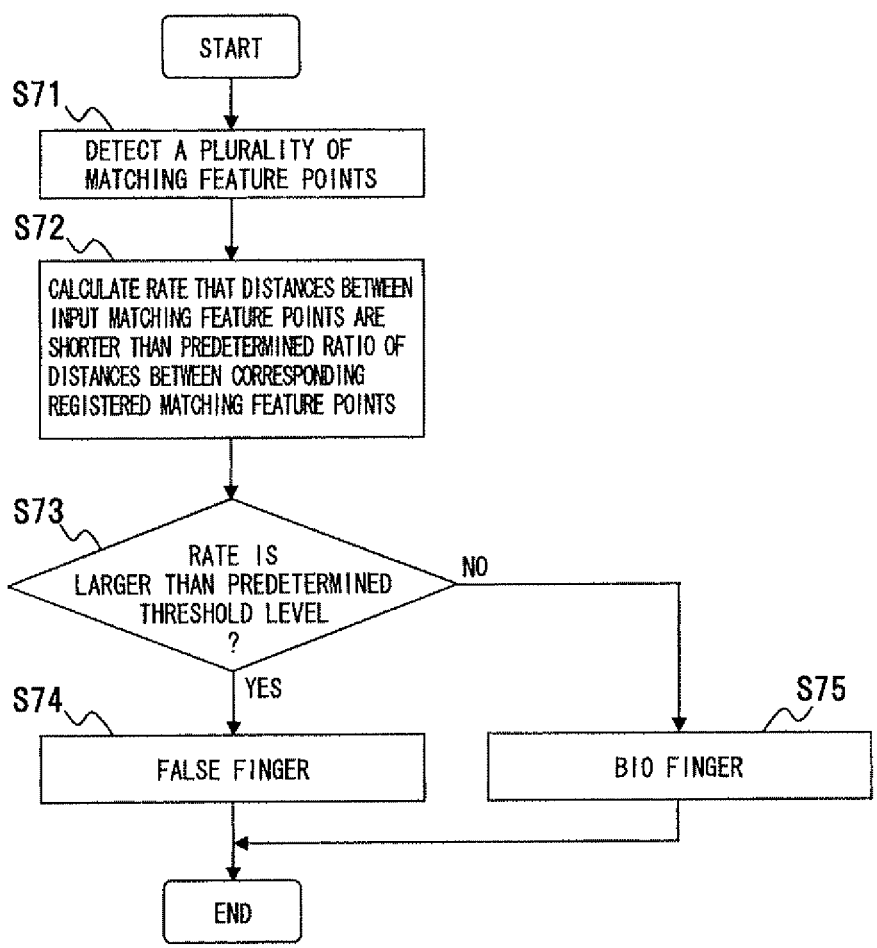
FIG. 15 is a flowchart showing one example of processing procedure of verification.

In this processing procedure, a fixed rate may be set to the distances between the input matching feature points. The processing procedure in this case will now refer to FIG. 15. FIG. 15 is a flowchart showing one example of processing procedure of verification in this case. Structure shown in FIG. 15 is one example and the present invention is not limited to such structure.

Then, in this processing procedure, as shown in FIG. 15, a plurality of matching feature points are detected (step S71), concerning a plurality of the matching feature points, a rate that the distances between the input matching feature points are shorter than a predetermined ratio of distances between the corresponding registered matching feature points is calculated (step S72), whether the rate is larger than a predetermined threshold level is determined (step S73), if larger (YES of step S73), it is determined to be a false finger (step S74) and if smaller (NO of step S73), it is determined to be a bio finger (step S75), and the process is ended. In this embodiment, as is the same as the first embodiment, the fingerprint authentication apparatus 12 shown in FIG. 8 and the processing procedure shown in FIG. 9 are used.

According to such determination process, by calculating a rate that distances between the input matching feature points are shorter than a predetermined ratio of distances between the corresponding registered matching feature points to distinguish a false finger if the rate is larger than the predetermined threshold level, whether a bio finger or a false finger can be determined with avoiding influence of image distortion, thus, high accurate authentication can be processed.

According to such determination process, determination whether a bio finger or a false finger can be made with avoiding influence of image distortion, thus, high accurate authentication can be processed.

Fourth Embodiment

Figure 16:
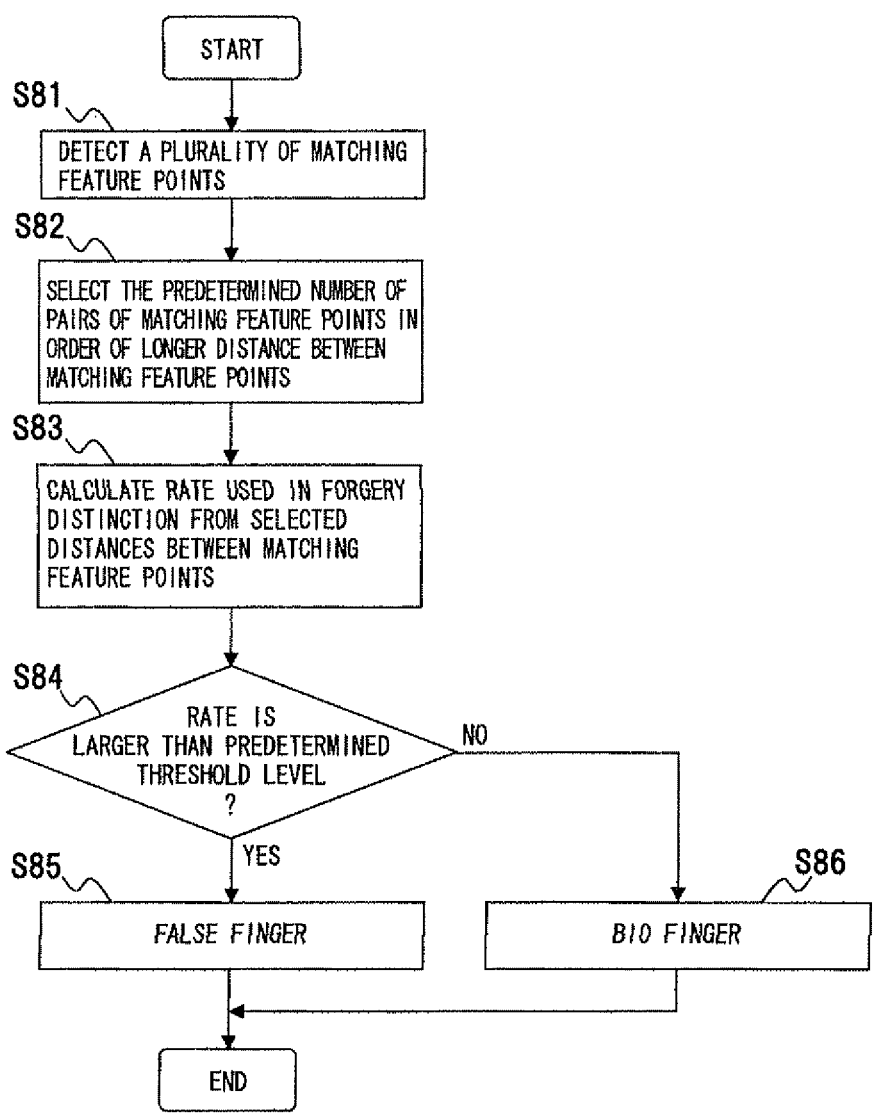
FIG. 16 is a flowchart showing one example of processing procedure of verification according to a fourth embodiment.

A fourth embodiment will now refer to FIG. 16. FIG. 16 is a flowchart showing one example of processing procedure of verification. Structure shown in FIG. 16 is one example and the present invention is not limited to such structure.

In this fourth embodiment, pairs of matching feature points are selected and a determination process is executed. That is, considering that obtaining distances of all combinations takes much time, and in case of shorter distances, influence of image distortion becomes huge, the predetermined number of pairs of matching feature points are selected in order of longer distance between matching feature points, thus a rate used in a forgery distinction may be calculated from the selected distances of the matching feature points.

Then, in this processing procedure, as shown in FIG. 16, a plurality of matching feature points are detected (step S81), concerning the plurality of matching feature points, the predetermined number of pairs of the matching feature points are selected in order of longer distance between the matching feature points (step S82), a rate used in a forgery distinction is calculated from the selected distances between the matching feature points (step S83), whether the rate is larger than a predetermined threshold level is determined (step S84), if larger (YES of step S84), it is determined to be a false finger (step S85) and if smaller (NO of step S84) it is determined to be a bio finger (step S86), and the process is ended. In this embodiment, as is the same as the first embodiment, the fingerprint authentication apparatus 12 shown in FIG. 8 and the processing procedure shown in FIG. 9 are used.

According to such determination process, determination whether a bio finger or a false finger can be made with avoiding influence of image distortion, thus, high accurate authentication can be processed.

Fifth Embodiment

Figure 17:
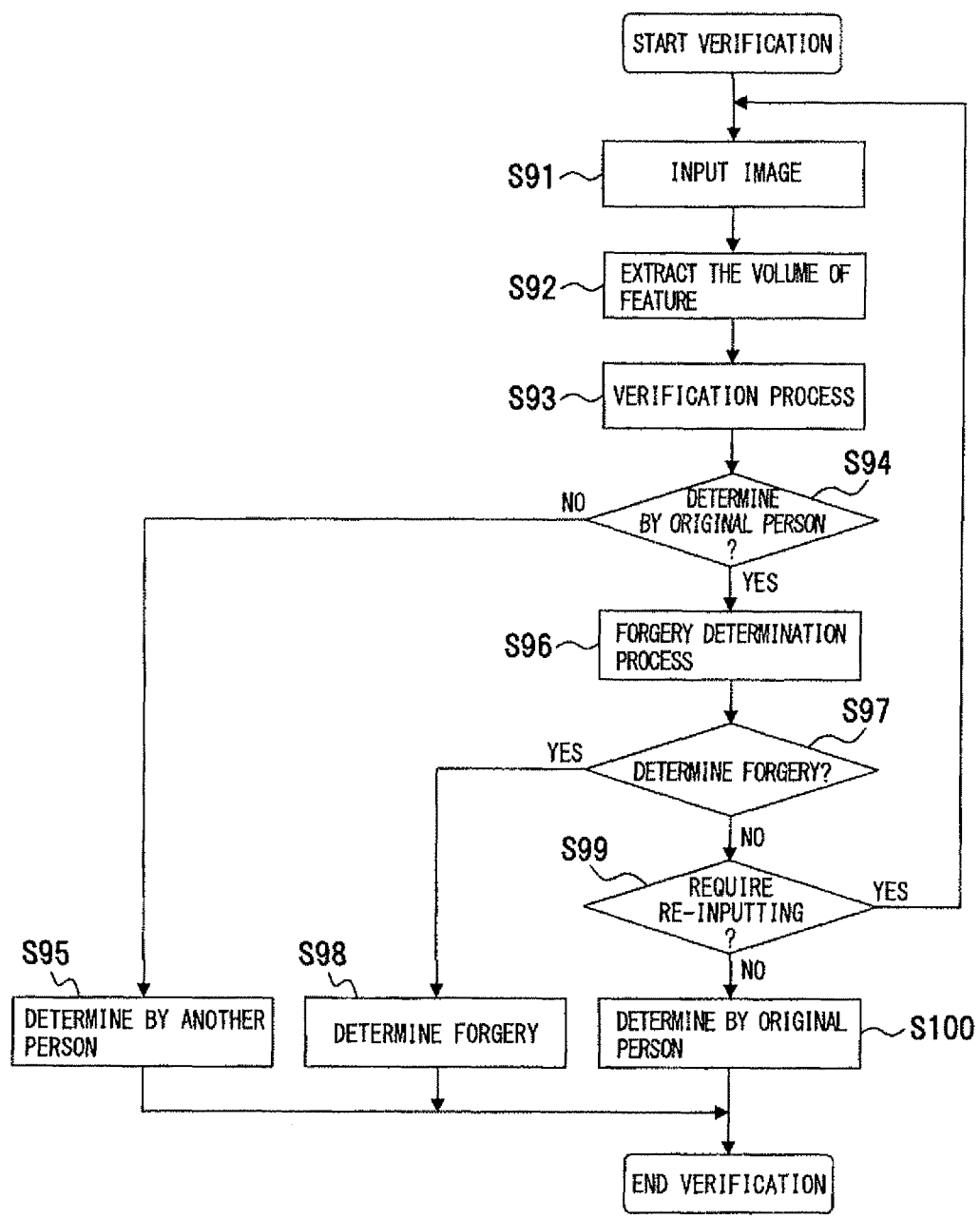
FIG. 17 is a flowchart showing one example of processing procedure of verification according to a fifth embodiment.

A fifth embodiment will now refer to FIG. 17. FIG. 17 is a flowchart showing one example of processing procedure of verification. Structure shown in FIG. 17 is one example and the present invention is not limited to such structure.

This fifth embodiment is a determination process in case where a bio finger shows feature near a false finger. Depending on an input method, there is a case where a bio finger gives feature near a false finger. Thus, a false finger threshold level for discriminating a false finger and a re-input threshold level where discrimination whether a false finger or not is difficult are set, and if a rate calculated for a forgery determination is larger than the false finger threshold level, it is distinguished to be a false finger, and if the rate is smaller than the false finger threshold level and larger than the reinput threshold level, re-inputting can be requested. In this embodiment, as is the same as the first embodiment, the fingerprint authentication apparatus 12 shown in FIG. 8 is used.

Then, this processing procedure is, as shown in FIG. 17, started by an event of a power source, etc. A fingerprint image is inputted by a fingerprint image reading unit 14 (step S91), if the fingerprint image is read out, the volume of feature is extracted from the fingerprint image (step S92) and feature data is extracted by the extraction of the volume of the feature. The extracted feature data is input feature data, and by a verification process in a verification unit 18 (step S93), the input feature data is verified with registered feature data. The registered feature data is registered in a feature data storing unit 20 in advance, and is read out from the feature data storing unit 20 in verification. Based on the verification process, whether the input feature data is by an original person or not is determined (step S94). If the input feature data cannot be determined to be by an original person (NO of step S94), it is determined to be by another person (step S95) and the verification process is ended.

If the input feature data can be determined to be by an original person (YES of step S94), a forgery determination process in a forgery distinction unit 22 is executed (step S96) and whether verification data, that is, the input feature data reduces uniformly or not is determined (step S97). If the input feature data reduces uniformly (YES of step S97), it is determined to be a forgery (step S98) and if it does not reduce uniformly (NO of step S97), necessity of re-inputting is determined (step S99). For this determination, a re-input threshold level where discrimination whether a bio finger or a false finger is difficult is set, and if a rate calculated for a forgery distinction is larger than the false finger threshold level, it is determined to be a false finger, and if the rate is smaller than the false finger threshold level and larger than the re-input threshold level, re-inputting is requested. That is, if re-inputting is necessary (YES of step S99), the process returns to step S91 and if re-inputting is not necessary (NO of step S99), it is determined to be by an original person (step S100), and the verification process is ended.

According to such determination process, determination whether a bio finger or a false finger can be made with avoiding influence of image distortion, thus, high accurate authentication can be processed.

Sixth Embodiment

Figure 18:
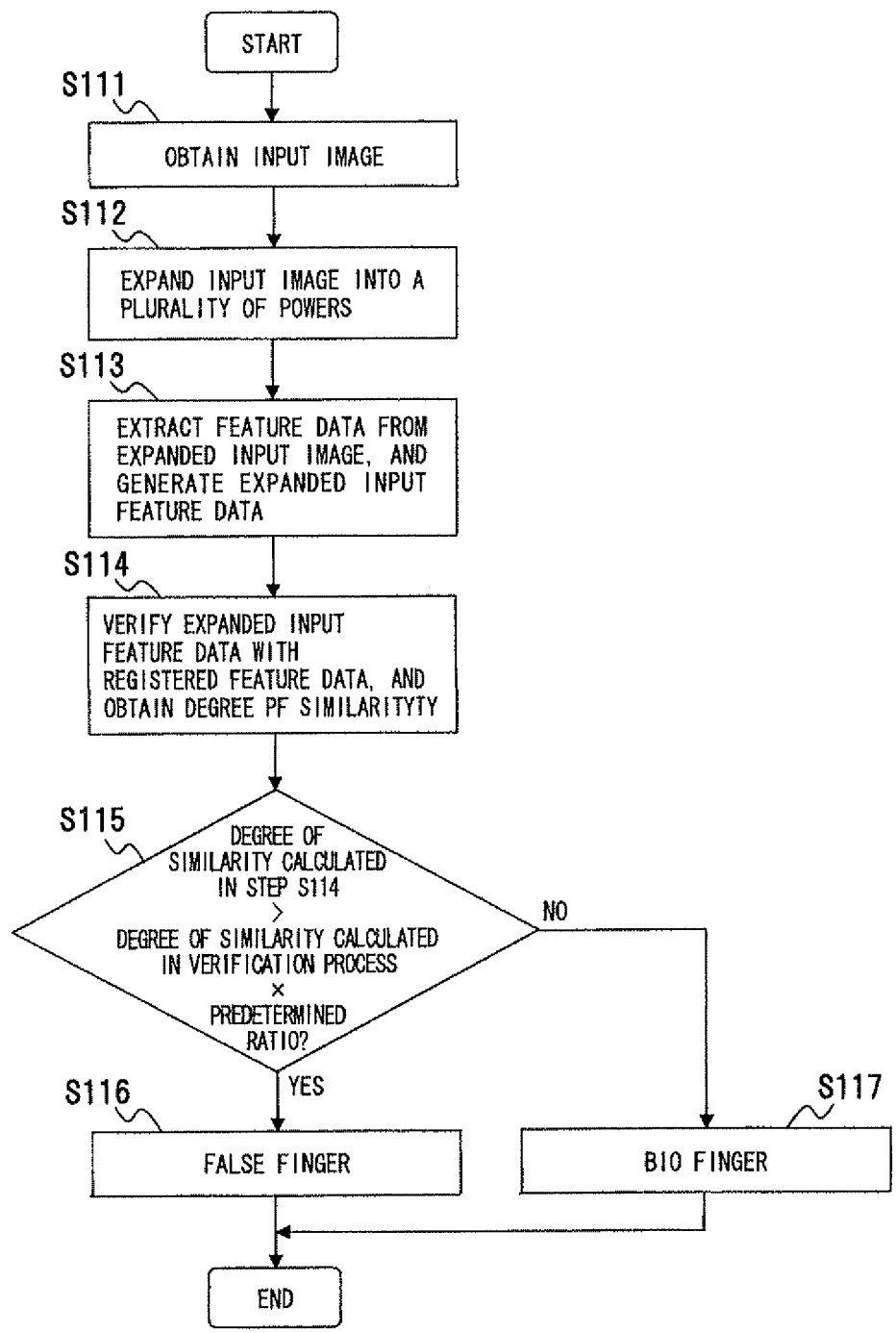
FIG. 18 is a flowchart showing one example of processing procedure of verification according to a sixth embodiment.

A sixth embodiment will now refer to FIG. 18. FIG. 18 is a flowchart showing one example of processing procedure of verification. Structure shown in FIG. 18 is one example and the present invention is not limited to such structure.

In the first to fifth embodiments, verification by a method of feature points is exemplified. Other methods can detect input feature information reducing uniformly. For example, if an input image reduces uniformly, when the image is verified after being back to size of a bio finger, a higher matching degree can be obtained. This determination process can be realized by verification methods such as a feature points method, a pattern matching method and a frequency method.

In this processing procedure, after an input image expands into a plurality of powers, registered feature data is verified with expanded input feature data obtained by extracting feature data. If a degree of similarity obtained from the result is larger than a value constituted of a product of a degree of similarity obtained by the described verification unit 18 (FIG. 8) and a predetermined ratio, it is determined to be a false finger. In this embodiment, as is the same as the first embodiment, the fingerprint authentication apparatus 12 shown in FIG. 8 and the processing procedure shown in FIG. 9 are used.

In this processing procedure, as shown in FIG. 18, an input image is obtained by an image input process (step S111), this input image is expanded into a plurality of powers by an expansion process (step S112), feature data is extracted from the expanded input image by a feature data extraction process, and expanded input feature data is generated (step S113).

The expanded input feature data is verified with registered feature data, and a degree of similarity of the expanded input feature data and the registered feature data is calculated (step S114). As to the calculated degree of similarity, it is determined whether a condition where the degree of similarity is larger than a value constructed of a product of "a degree of similarity calculated in a verification process" and "a predetermined ratio" is met, that is, $$\text{the degree of similarity calculated in step S114} > (\text{the degree of similarity calculated in the verification process}) * (\text{a predetermined ratio}) \quad (1)$$

is met (step S115). If the condition is met (YES of step S115), it is determined to be a false finger (step S116) and if the above condition is not met (NO of step S115), it is determined to be a bio finger (step S117).

According to such determination process, determination whether a bio finger or a false finger can be made with avoiding influence of image distortion, thus, high accurate authentication can be processed.

As to the above formula (1), since it cannot be determined whether the degree of similarity calculated in step S114 is a false finger in the same threshold level, in step S115, it is determined whether the degree of similarity calculated in step S114 is over a value that the degree of similarity calculated in a verification process is multiplied by the predetermined ratio.

If magnitude of the degree of similarity calculated in a verification process (a degree of similarity when not expanded and reduced) is compared, whether a false finger or not can be determined. If a false finger, since an input image reduces, "the degree of similarity calculated in step S114 in case where an input image is expanded in accordance with a degree of reduction of the input image" is more highly calculated than "the degree of similarity calculated in a verification process". That is, if a false finger, $$\text{the degree of similarity calculated in step S114} > \text{the degree of similarity calculated in a verification process} \qquad (2)$$

On the contrary, in case of a bio finger, since an input image does not reduce, "the degree of similarity calculated in a verification process" is higher than "the degree of similarity calculated in step S114", no matter how the input image is expanded. That is, in case of a bio finger, $$\text{the degree of similarity calculated in step S114} < \text{the degree of similarity calculated in a verification process} \qquad (3)$$

In the above embodiment, more generally, as shown in the formula (1), what the predetermined ratio is multiplied is used.

In the embodiment, depending on a degree of reduction of an input image, an optimum expanded ratio in step S112 (the degree of similarity calculated in step S114 is the highest) is different. Thus, not only into a single power ratio, but also into a plurality of power ratios, expansion are done, and each of degrees of similarity may be calculated in step S114 to use each of degrees of the similarity.

In the embodiment, "the degree of similarity calculated in a verification process" is used. The present invention is not limited to such degree of similarity, and "the degree of similarity calculated from one-power expanded input feature data and registered feature data" may be used.

Seventh Embodiment

Figure 19:
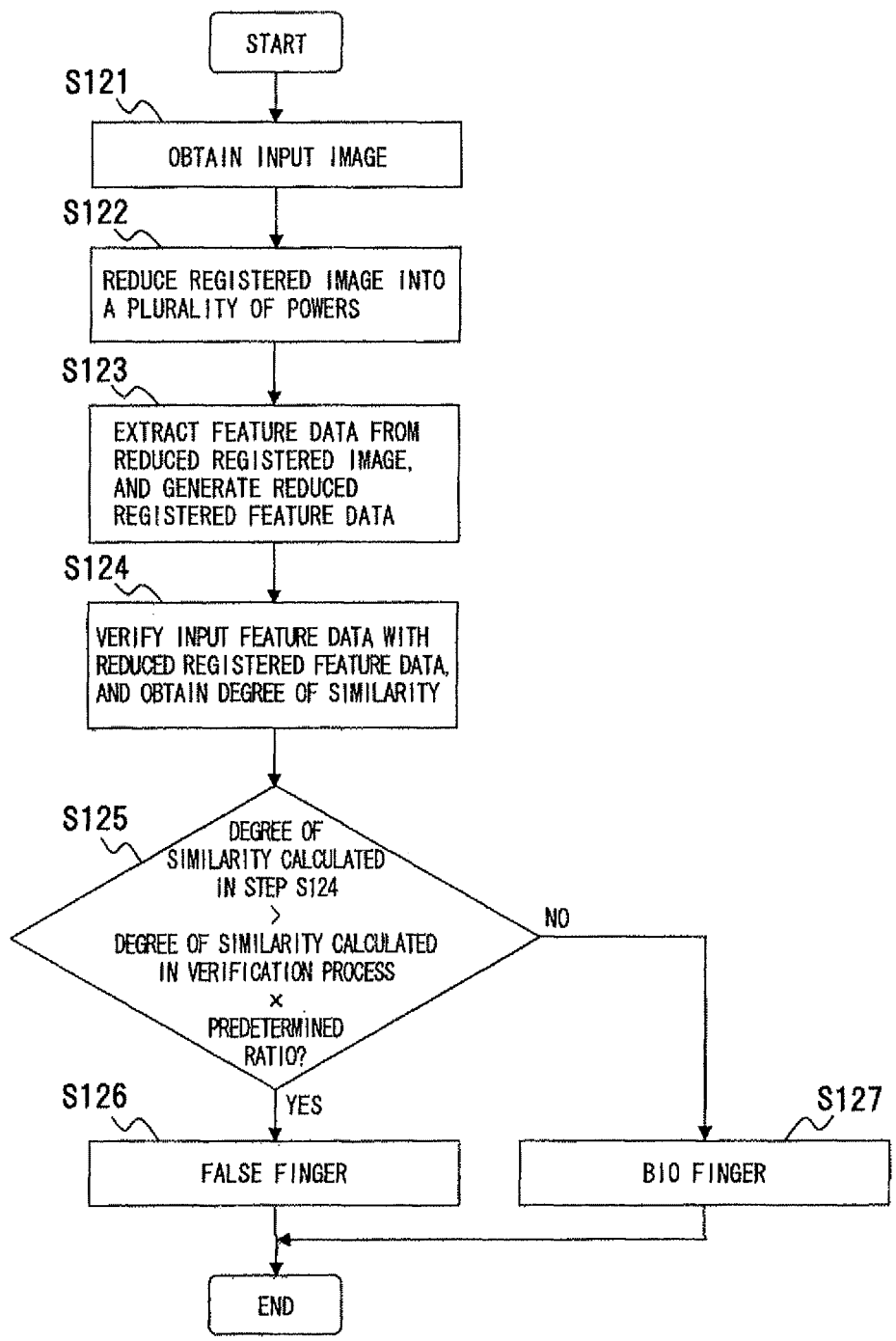
FIG. 19 is a flowchart showing one example of processing procedure of verification according to a seventh embodiment.

A seventh embodiment will now refer to FIG. 19. FIG. 19 is a flowchart showing one example of processing procedure of verification. Structure shown in FIG. 19 is one example and the present invention is not limited to such structure.

In the sixth embodiment, the case where input feature data is expanded to be verified was described. Registered feature data may reduce to be verified, and more highly matching can be obtained. In this processing procedure, the input feature data is verified with reduced registered feature data obtained by extracting feature data after a registered image reduces into a plurality of powers. If a degree of similarity obtained from the result is larger than a value constituted of a product of the degree of similarity obtained by a verification unit 18 and a predetermined ratio, it is distinguished to be a false finger. In this embodiment, as is the same as the first embodiment, the fingerprint authentication apparatus 12 shown in FIG. 8 and the processing procedure shown in FIG. 9 are used.

In this processing procedure, as shown in FIG. 19, an input image is obtained by an image input process (step S121), an registered image is reduced into a plurality of powers by an image reduction process (step S122), and by extracting feature data from the reduced registered image, reduced registered feature data is generated (step S123).

The input feature data and the reduced registered feature data are verified, and a degree of similarity is calculated (step S124). As to the calculated degree of similarity, it is determined whether a condition where the degree of similarity is larger than a value consisted of a product of "the degree of similarity calculated in a verification process" and "a predetermined ratio" is met, that is, "the degree of similarity calculated in step S124>(the degree of similarity calculated in a verification process)*(a predetermined ratio)" is met (step S125). If the condition is met (YES of step S125), it is determined to be a false finger (step S126) and if the above condition is not met (NO of step S125), it is determined to be a bio finger (step S127).

According to such determination process, determination whether a bio finger or a false finger can be made with avoiding influence of image distortion, thus, high accurate authentication can be processed.

In the embodiment, depending on a degree of reduction of a registered image, an optimum reduced ratio in step S122 (the degree of similarity calculated in step S124 is the highest) is different. Thus, not only into a single power, but also into a plurality of powers, reductions are done, and each of degrees of similarity may be calculated in step S124 to use each of the degrees of similarity.

In the embodiment, "the degree of similarity calculated in a verification process" is used. The present invention is not limited to such degree, and "a degree of similarity calculated from input feature data, and one-power reduced registered feature data" may be used.

Eighth Embodiment

Figure 20:
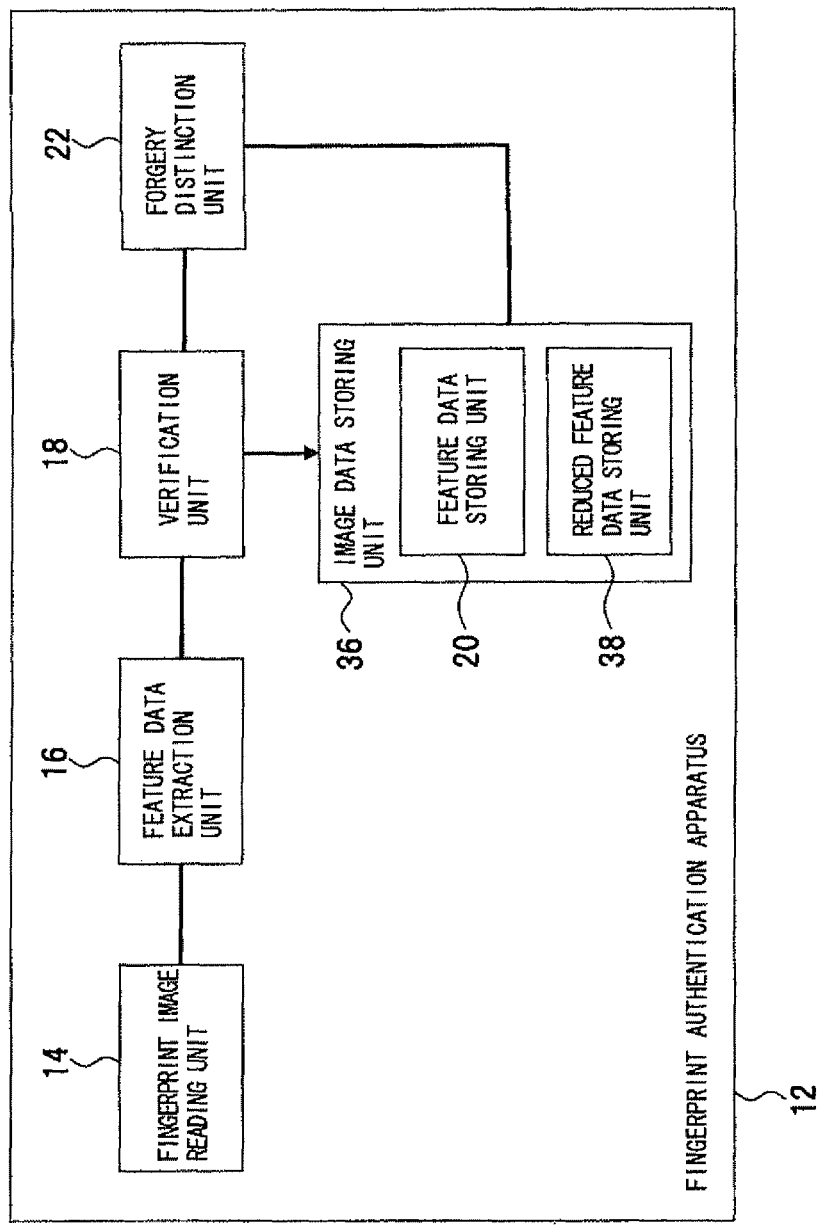
FIG. 20 depicts a function block of a fingerprint authentication apparatus according to an eighth embodiment.

An eighth embodiment will now refer to FIG. 20. FIG. 20 depicts a function block of a fingerprint authentication apparatus according to an eighth embodiment. Structure shown in FIG. 20 is one example and the present invention is not limited to such structure. In FIG. 20, the same components as described in FIG. 8 are denoted by the same reference numerals.

In this embodiment, as shown in FIG. 20, the feature data storing unit 20 and a reduced feature data storing unit 38 are provided with an image data storing unit 36 that is a data storing unit. Other structures are the same as FIG. 8, and the description thereabout is omitted with adding the same reference numerals. In this embodiment, as is the same as the first embodiment, the processing procedure shown in FIG. 9 is used.

In this embodiment, the input image is verified with reduced registered feature data obtained by extracting feature data after a registered image reduces into a plurality of powers. If a degree of similarity obtained from the result is larger than a value constituted of a product of the degree of similarity obtained by the verification unit 18 and a predetermined ratio, it is distinguished to be a false finger.

In this case, since the reduction feature data storing unit 38 that stores reduced registered feature data in advance is provided, there is no need to generate reduced registered feature data by a forgery determination, and a speedy determination process can be achieved.

Ninth Embodiment

Figure 21:
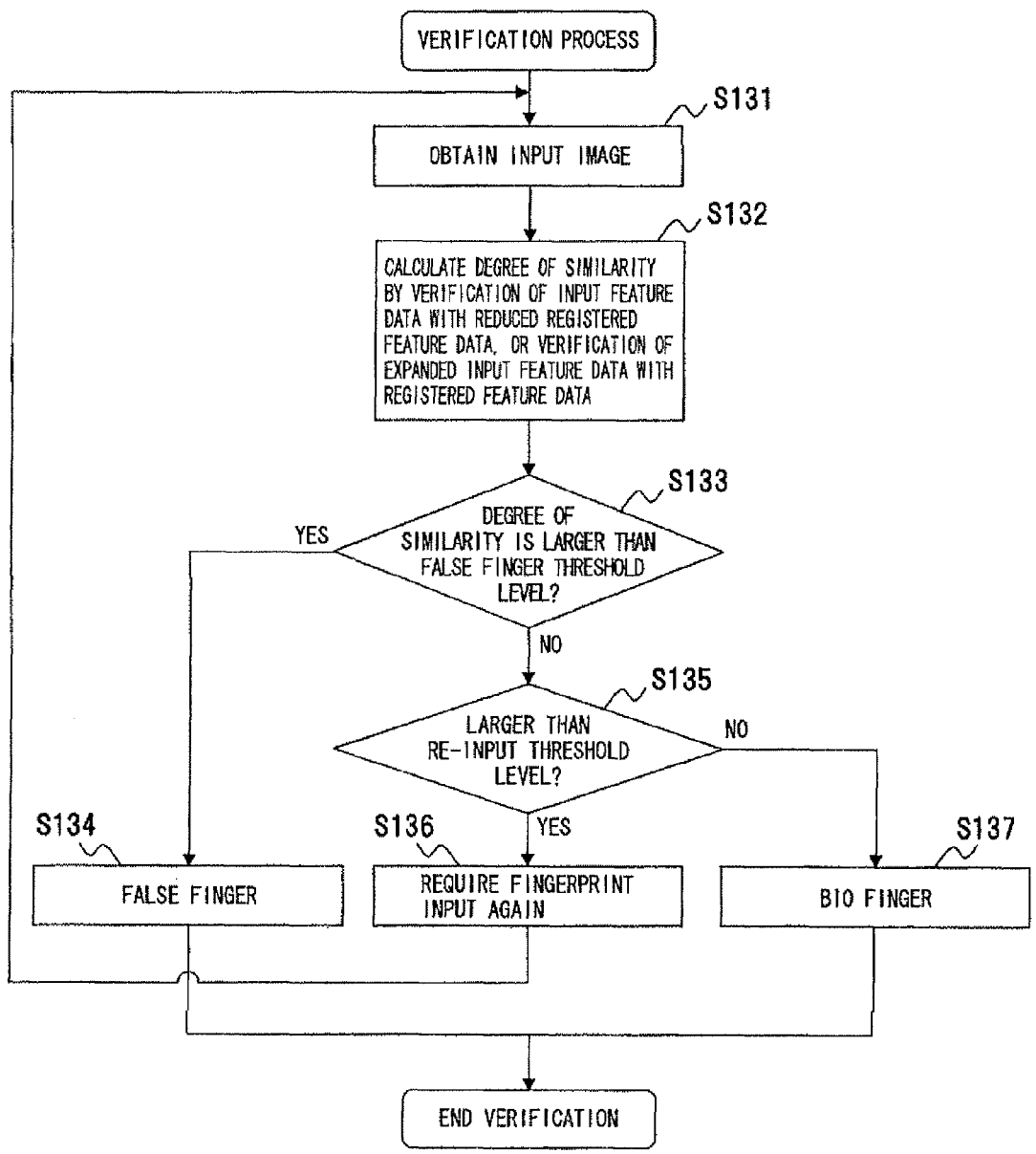
FIG. 21 is a flowchart showing one example of processing procedure of verification according to a ninth embodiment.

A ninth embodiment will now refer to FIG. 21. FIG. 21 is a flowchart showing one example of processing procedure of verification. Structure shown in FIG. 21 is one example and the present invention is not limited to such structure.

In this ninth embodiment, a false finger threshold level for discriminating a false finger and a re-input threshold level where discrimination whether a false finger or not is difficult are set, and if a degree of similarity calculated for a forgery determination is larger than the false finger threshold level, it is distinguished to be a false finger, and if the degree of similarity is smaller than the false finger threshold level and larger than the re-input threshold level, re-inputting of fingerprints is requested. This method is applicable to all the methods including a feature points method since executing only expansion and reduction of an image itself. In this embodiment, as is the same as the first embodiment, the fingerprint authentication apparatus 12 shown in FIG. 8 and the processing procedure shown in FIG. 9 are used.

Thus, in this processing procedure, as shown in FIG. 21, an input image is obtained by an image input process (step S131), a degree of similarity is calculated by verification of input feature data and reduced registered feature data, or verification of expanded input feature data and registered feature data (step S132), whether the degree of similarity is larger than the false finger threshold level is determined (step S133), if the degree of similarity is larger than the false finger threshold level (YES of step S133), it is determined to be a false finger (step S134) and if the degree of similarity is smaller than the false finger threshold level (NO of step S133), it is determined whether the degree of similarity is larger than the re-input threshold level (step S135). If the degree of similarity is larger than the re-input threshold level (YES of step S135), re-inputting of fingerprints is requested (step S136), and if the degree of similarity is smaller than the re-input threshold level (NO of step S135), it is determined to be a bio finger (step S137).

According to such determination process, determination whether a bio finger or a false finger can be made with avoiding influence of image distortion, thus, high accurate authentication can be processed.

Tenth Embodiment

Figure 22:
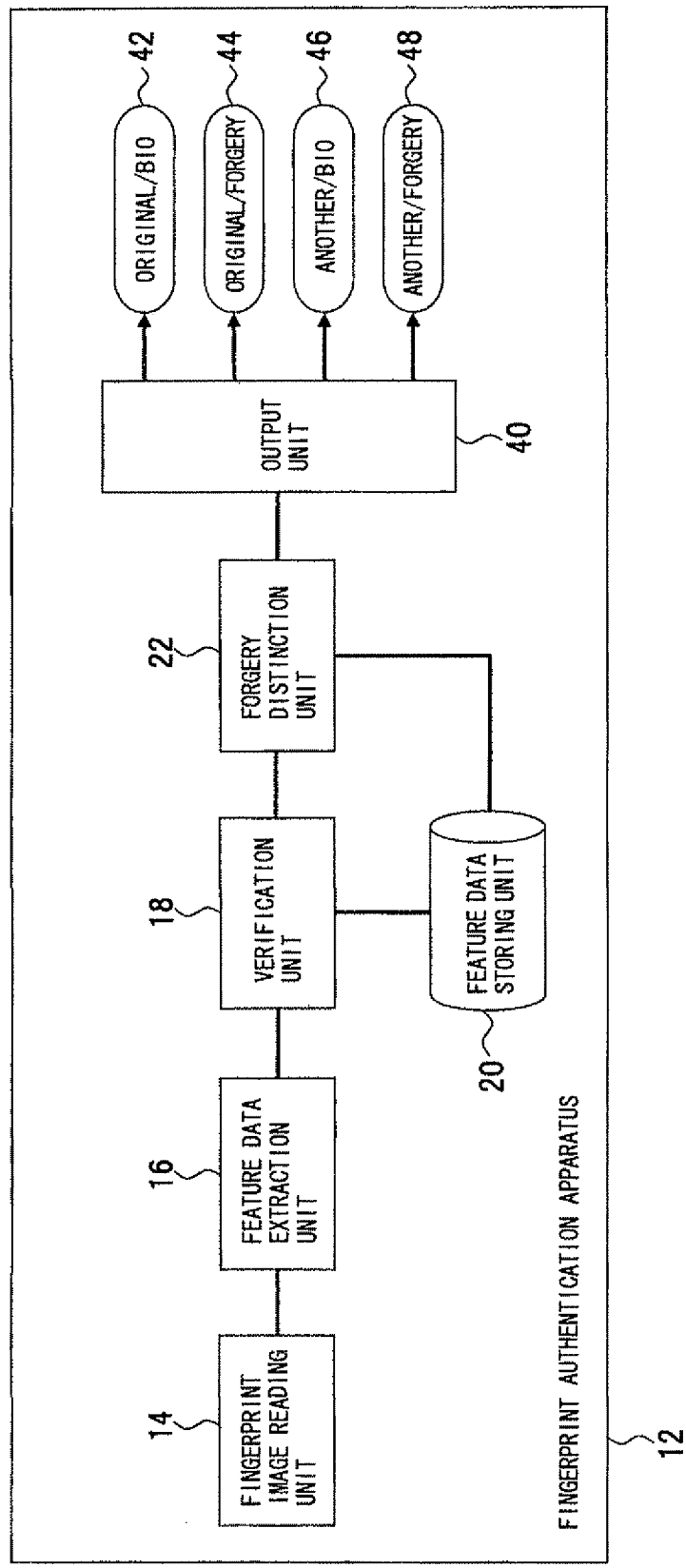
FIG. 22 depicts a function block of a fingerprint authentication apparatus according to a tenth embodiment.
Figure 23:
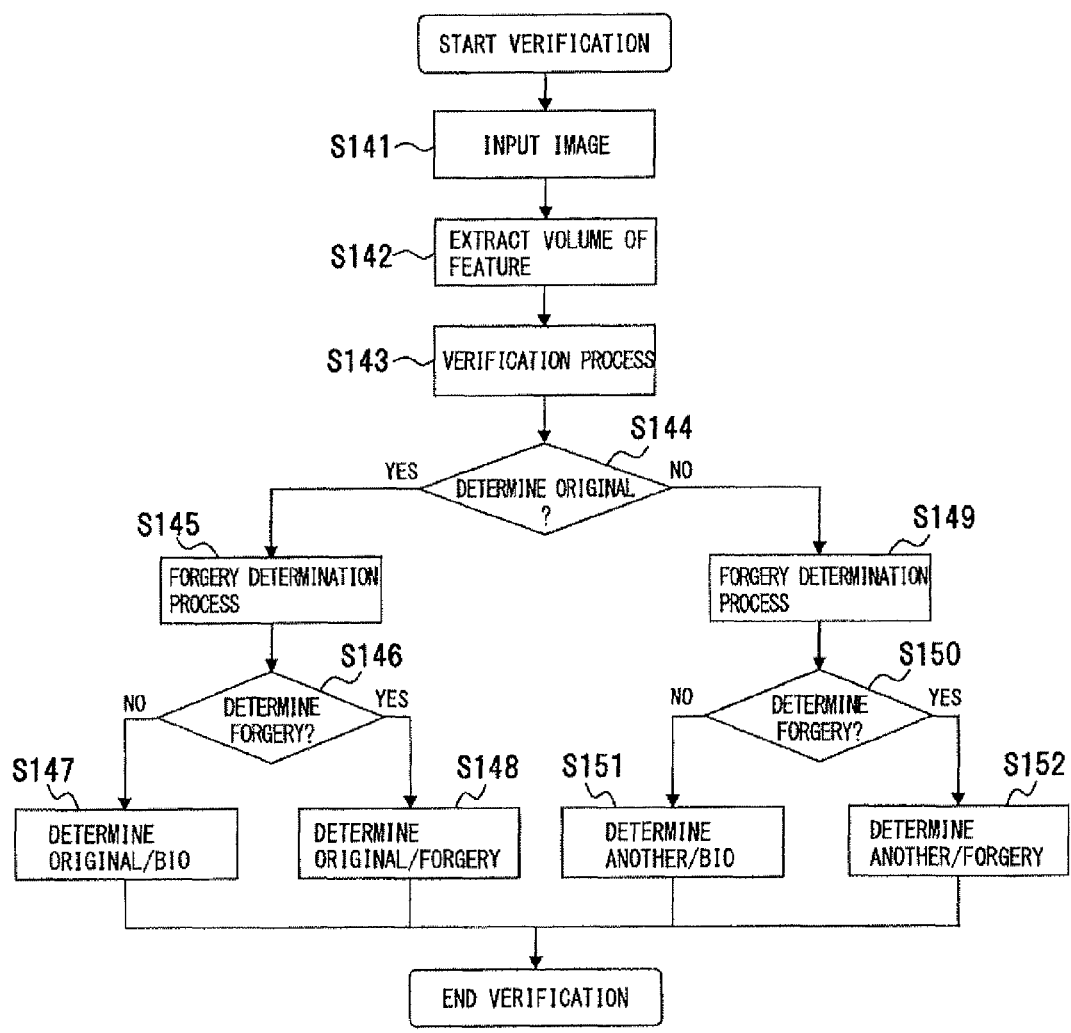
FIG. 23 is a flowchart showing one example of processing procedure of verification.

A tenth embodiment will now refer to FIGS. 22 and 23. FIG. 22 depicts a function block of a fingerprint authentication apparatus according to a tenth embodiment, and FIG. 23 is a flowchart showing one example of processing procedure of verification. Structure shown in FIGS. 22 and 23 is one example and the present invention is not limited to such structure.

An fingerprint authentication apparatus 12 of this embodiment, as shown in FIG. 22, an output unit 40 that takes out an output of a forgery distinction unit 22 is disposed, and is configured that four outputs of an original person/bio output 42, an original person/a forgery output 44, another person/bio output 46 and another person/a forgery output 48 are taken out. Concerning other structures, the description thereabout is omitted with denoting the same reference numerals as FIG. 8 to the same components as FIG. 8.

This processing procedure is, as shown in FIG. 23, one example of an authentication method and an authentication program, and started by an event of a power supply, etc. A fingerprint image is input by the fingerprint image reading unit 14 (step S141), if the fingerprint image is read out, the volume of feature is extracted from the fingerprint image (step S142), and feature data is extracted from the extraction of the volume of feature. The extracted feature data is input feature data. The input feature data is verified with registered feature data by a verification process in the verification unit 18 (step S143). The registered feature data is registered in the feature data storing unit 20 in advance. In verification, the registered feature data is read out from the feature data storing unit 20. Based on the verification process, whether input feature data is by an original person is determined (step S144).

If the input feature data is determined to be by an original person (YES of step S144), a forgery distinction process of the forgery distinction unit 22 is executed (step S145). In this case, it is determined whether verification data, that is, input feature data reduces uniformly or not (step S146), and if not reducing uniformly (NO of step S146), it is determined to be by an original person and a living body (step S147). In this case, the original person/bio output 42 is obtained and the verification process is ended. If the input feature data reduces uniformly (YES of step S146), it is determined to be by an original person and a false finger (step S148). In this case, the original person/forgery output 44 is obtained and the verification process is ended.

Even if the input feature data cannot be determined to be by an original person (NO of step S144), the forgery determination process of the forgery distinction unit 22 is executed (step S149). In this case, it is also determined whether verification data, that is, input feature data reduces uniformly or not (step S150), and if not reducing uniformly (NO of step S150), it is determined to be by another person and a living body (step S151). In this case, another person/bio output 46 is obtained and the verification process is ended. If the input feature data reduces uniformly (YES of step S150), it is determined to be by another person and a false finger (step S152). In this case, another person/a forgery output 48 is obtained and the verification process is ended.

Eleventh Embodiment

Figure 24:
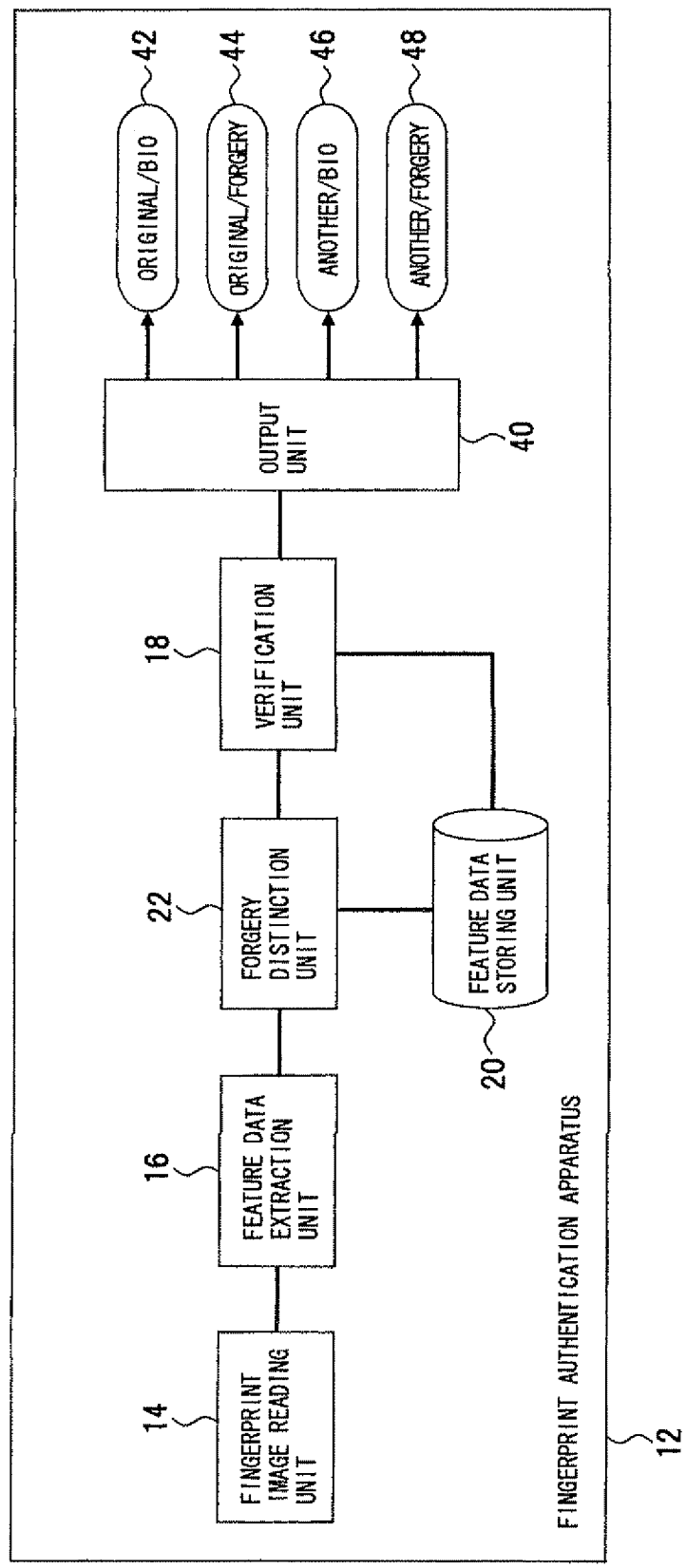
FIG. 24 depicts a function block of a fingerprint authentication apparatus according to an eleventh embodiment.
Figure 25:
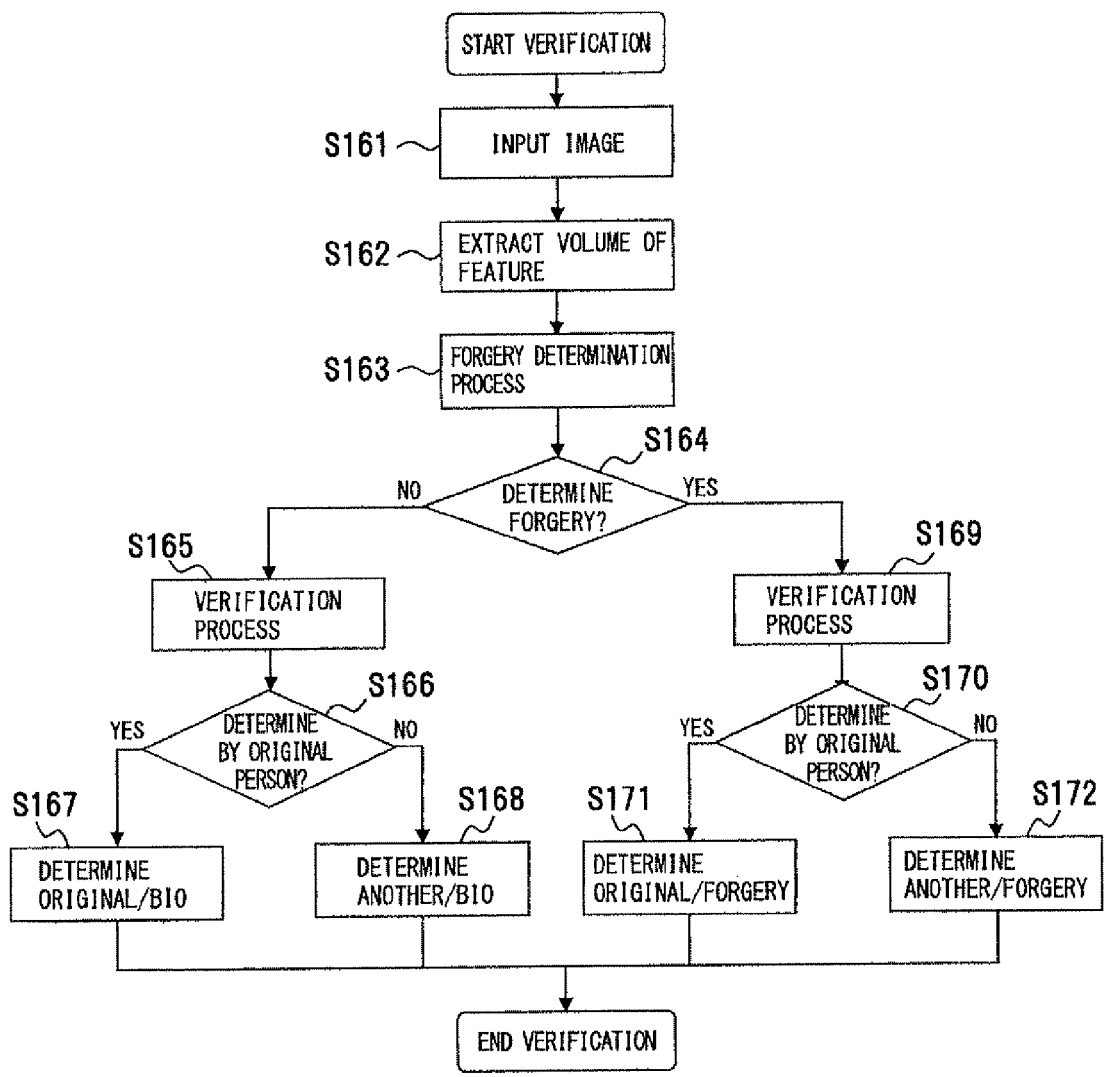
FIG. 25 is a flowchart showing one example of processing procedure of verification.

An eleventh embodiment will now refer to FIGS. 24 and 25. FIG. 24 depicts a function block of a fingerprint authentication apparatus according to an eleventh embodiment, and FIG. 25 is a flowchart showing one example of processing procedure of verification. Structure shown in FIGS. 24 and 25 is one example and the present invention is not limited to such structure.

In an fingerprint authentication apparatus 12 of this embodiment, as shown in FIG. 24, it is configured that a forgery distinction unit 22 is disposed before a verification unit 18, an output unit 40 that takes out an output of the verification unit 18 is disposed, and four outputs of an original person/bio output 42, original person/a forgery output 44, another person/bio output 46 and another person/a forgery output 48 are taken out. Concerning other structures, the description thereabout is omitted with denoting the same reference numerals as FIG. 22 to the same parts as FIG. 22.

This processing procedure is, as shown in FIG. 25, one example of an authentication method and an authentication program, and started by an event of a power supply, etc. A fingerprint image is input by the fingerprint image reading unit 14 (step S161), if the fingerprint image is read out, the volume of feature is extracted from the fingerprint image (step S162), and feature data is extracted from the extraction of the volume of feature. The extracted feature data is input feature data. A forgery determination process of the forgery distinction unit 22 is executed by using the input feature data (step S163), and whether it is a forgery or not is determined (step S164). That is, whether input feature data reduces uniformly is determined, and if uniformly reducing, it is determined to be a forgery, and if not uniformly reducing, it is determined to be a living body.

If it is not a forgery (NO of step S164), the input feature data is verified with registered feature data by a verification process in the verification unit 18 (step S165). Since the registered feature data is registered in the feature data storing unit 20 in advance, the registered feature data is read out from the feature data storing unit 20 in verification. Based on the verification process, whether the input feature data is by an original person or not is determined (step S166).

If the input feature data is determined to be by an original person (YES of step S166), original person/bio output 42 is obtained (step S167), and the verification process is ended. If the input feature data is not determined to be by an original person (NO of step S166), another person/bio output 44 is obtained (step S168), and the verification process is ended.

If it is a forgery (YES of step S164), the input feature data is verified with registered feature data by a verification process in the verification unit 18 (step S169). The registered feature data is read out from the feature data storing unit 20 in verification. Based on the verification process, whether the input feature data is by an original person or not is determined (step S170).

If the input feature data is determined to be by an original person (YES of step S170), the original person/a forgery output 46 is obtained (step S171), and the verification process is ended. If the input feature data is not determined to be by an original person (NO of step S170), another person/a forgery output 48 is obtained (step S172), and the verification process is ended.

Twelfth Embodiment

Figure 26:
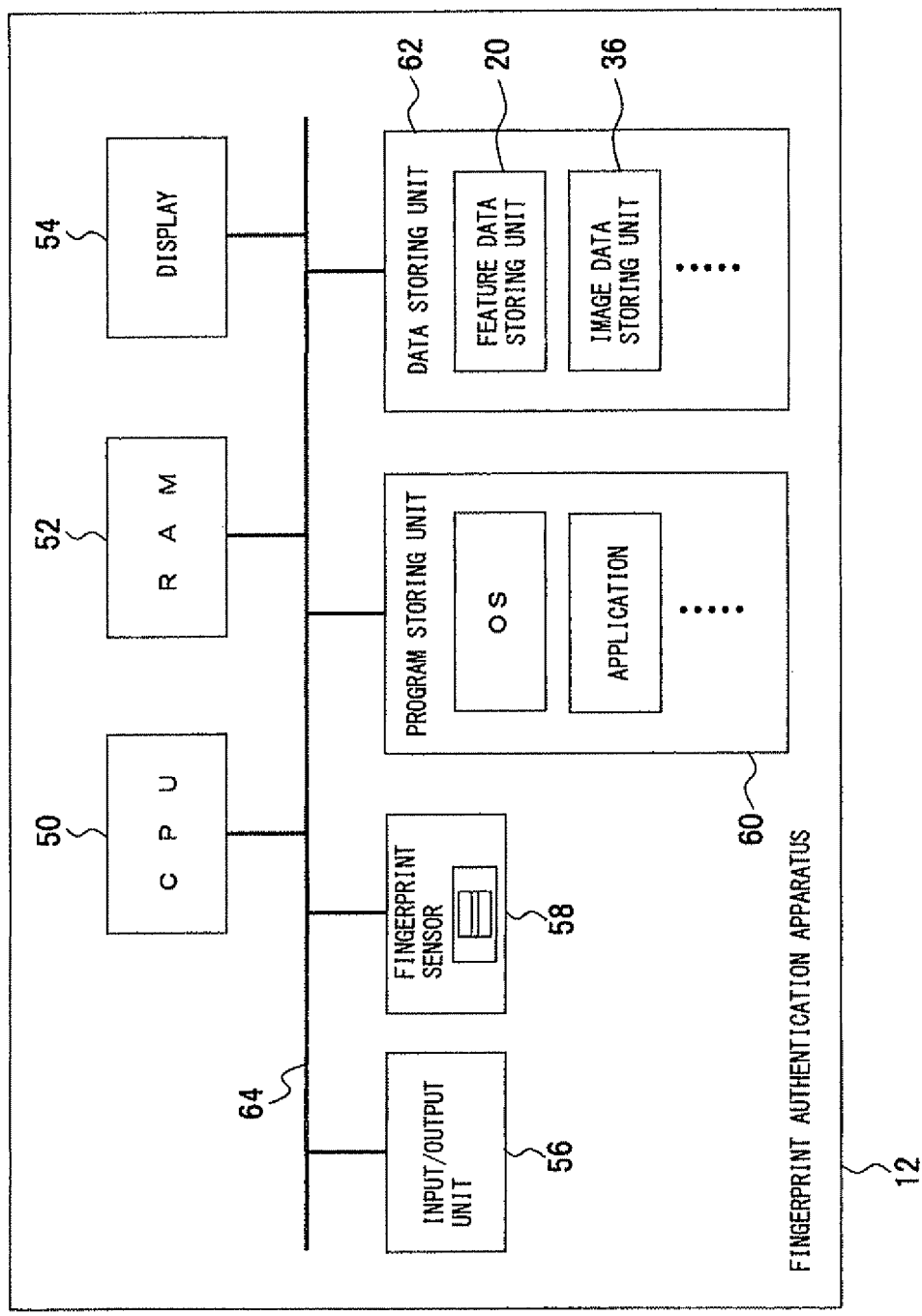
FIG. 26 depicts structure of hardware of a fingerprint authentication apparatus according to a twelfth embodiment.

A twelfth embodiment will now refer to FIG. 26. FIG. 26 depicts structure of hardware of a fingerprint authentication apparatus according to a twelfth embodiment. Structure shown in FIG. 26 is one example and the present invention is not limited to such structure. In FIG. 26, the same components as described in FIGS. 8, 20, 22 and 24 are denoted by the same reference numerals.

The fingerprint authentication apparatus 12 includes a computer as an information processing means. All or any one of the fingerprint authentication apparatuses 12 in the first, eighth, tenth and eleventh embodiments are composed of a computer as well.

Disposed in the fingerprint authentication apparatus 12 are a CPU (Central Processing Unit) 50, a RAM (Random-Access Memory) 52, a display 54, an input/output unit 56, a fingerprint sensor 58, a program storing unit 60 and a data storing unit 62. They are connected by a bus 64.

The CPU 50 is a control means for executing taking in an authentication image, a verification process, and other storing and calculating of various data by performing application programs such as an OS (Operating System) and an authentication program. The CPU 50 configures the described feature data extraction unit 16, verification unit 18, a forgery distinction unit 22 or output unit 40, etc.

The RAM 52 is a work area. The display 54 is an information proposing means, and for example, is composed of an LCD (Liquid Crystal Display). The input/output unit 56 also corresponds to the described output unit 40, etc., and is used for an input and output of information, etc. A keyboard and so on is used for information input.

The fingerprint sensor 58 is a taking means for fingerprint information as bio information, and is one example of the described fingerprint image reading unit 14. The fingerprint sensor 58 can take in a finger image by sliding a bio finger.

The program storing unit 60 is one example of a recording means for recording a program, and is composed of a recording medium that is readable and writable by a computer. This program storing unit 60 stores the described authentication program and a verification routine, etc. as an OS and an application program.

The data storing unit 62 is one example of a storing means for storing data. Storing units such as the described feature data storing unit 20, the image data storing unit 36 the reduced feature data storing unit 38, etc. are set in the data storing unit 62. All of them may be set, or necessary data storing may be set in accordance with the embodiments.

By using such fingerprint authentication apparatus 12, determination accuracy whether a living body or a forgery can be enhanced, thus, occurrence of rejection to an original person by an error determination as a forgery can be avoided.

Figure 27:
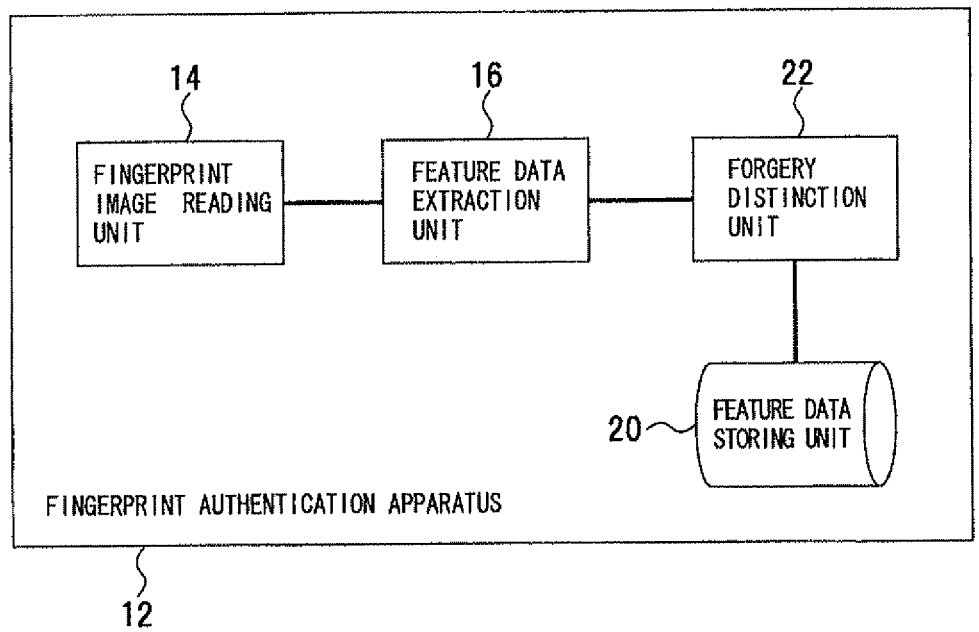
FIG. 27 depicts a function block of a fingerprint authentication apparatus according to another embodiment.

Features of Embodiments, Other Embodiments and so on (1) The above described embodiments (FIGS. 8, 20 and 22) show the structure of including the verification unit 18. If only forgery discrimination is executed, as shown in FIG. 27, structure of not including the verification unit 18 may be provided.

(2) In the above embodiments, the case of discriminating a reduced false finger was described. In accordance with materials, a false finger may be expanded. The same procedure can be applicable to the expanded false finger for discrimination.

(3) In the above embodiments, fingerprint authentication was explained as an example. The present invention can enhance accuracy of biometric authentication by detecting forgery's characteristic that does not exist in the living body with using vein information and palm information, etc. other than fingerprint authentication to determine whether a living body or a forgery.

(4) In the first to tenth embodiments, the forgery distinction unit 22 is disposed behind the verification unit 18. The forgery distinction unit 22 may be disposed before the verification unit 18 as well as the eleventh embodiment (FIG. 24).

(5) In the conventional fingerprint authentication, a fingerprint sensor is becoming downsizing at low cost, however, dedicated hardware is necessary for detection of a false fingerprints, thus, the necessity is a big hurdle for downsizing at low costs. According to the above embodiments, special hardware is not necessary, and false fingerprints can be discriminated highly accurately with very simple mechanism.

(6) If an electronic apparatus that mounts an authentication apparatus mounts a processor such as a computer like a personal computer and a portable device, whether a living body or a forgery can be determined with using such processor as the authentication apparatus too, thus, authentication accuracy of a living body can be enhanced.

Example

Figure 28:
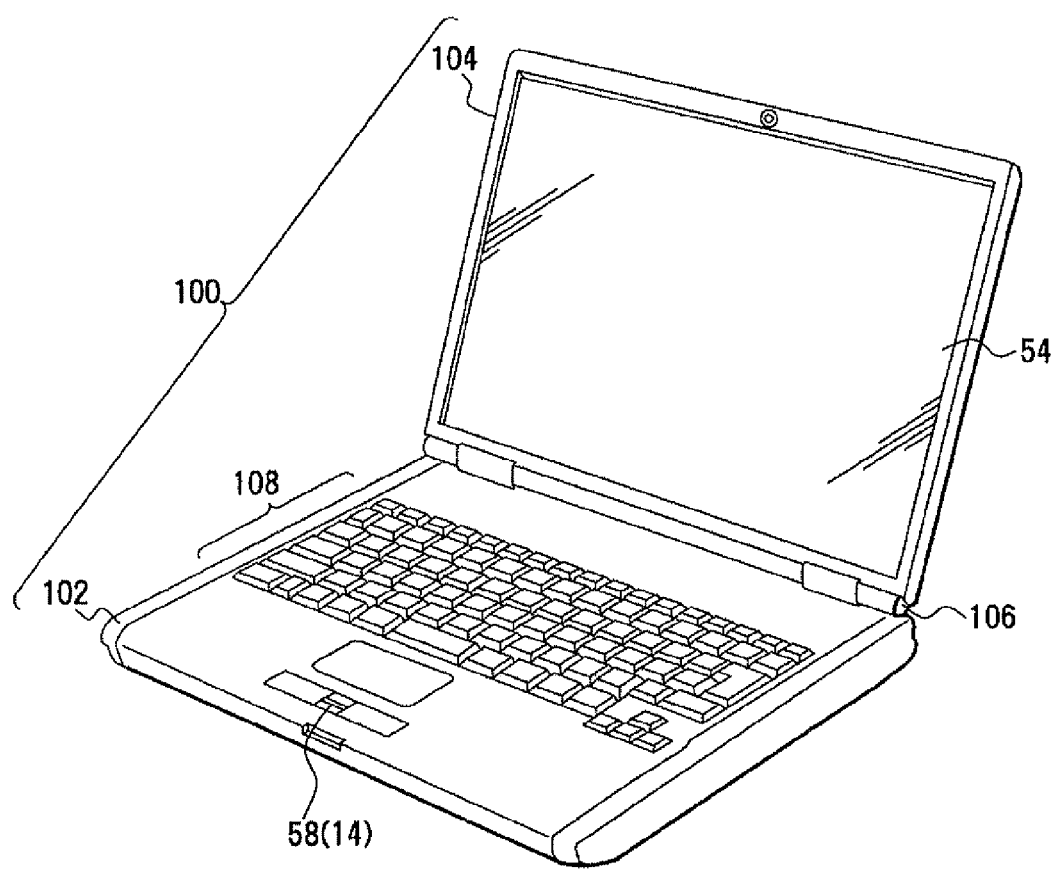
FIG. 28 depicts a personal computer.
Figure 29:
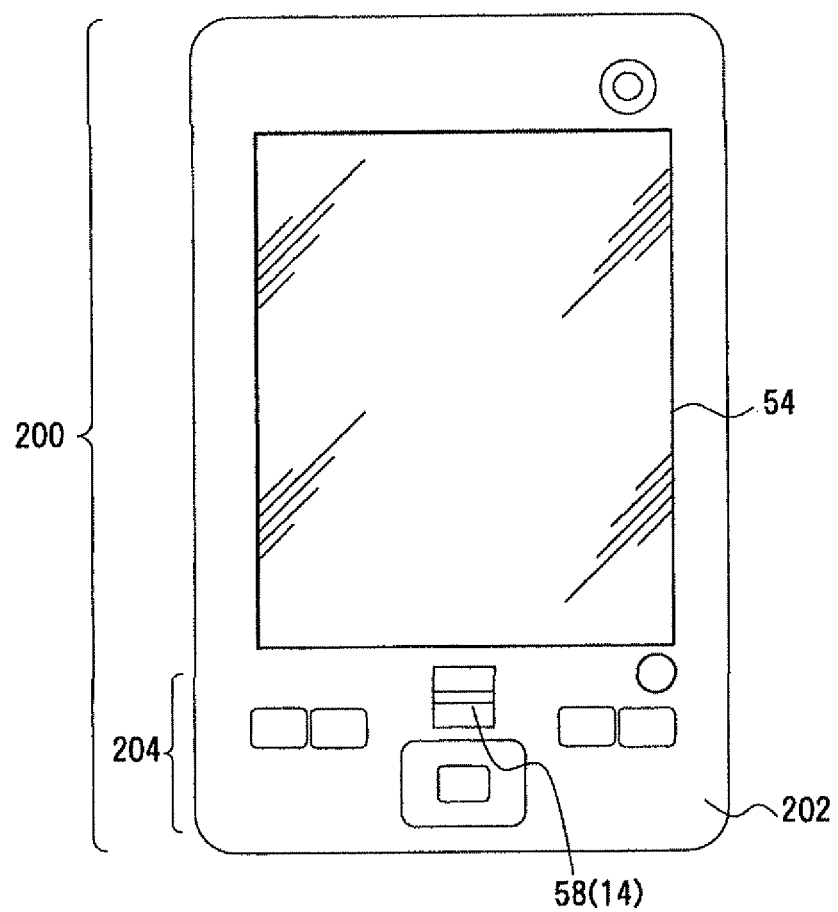
FIG. 29 depicts a personal digital assistant.
Figure 30:
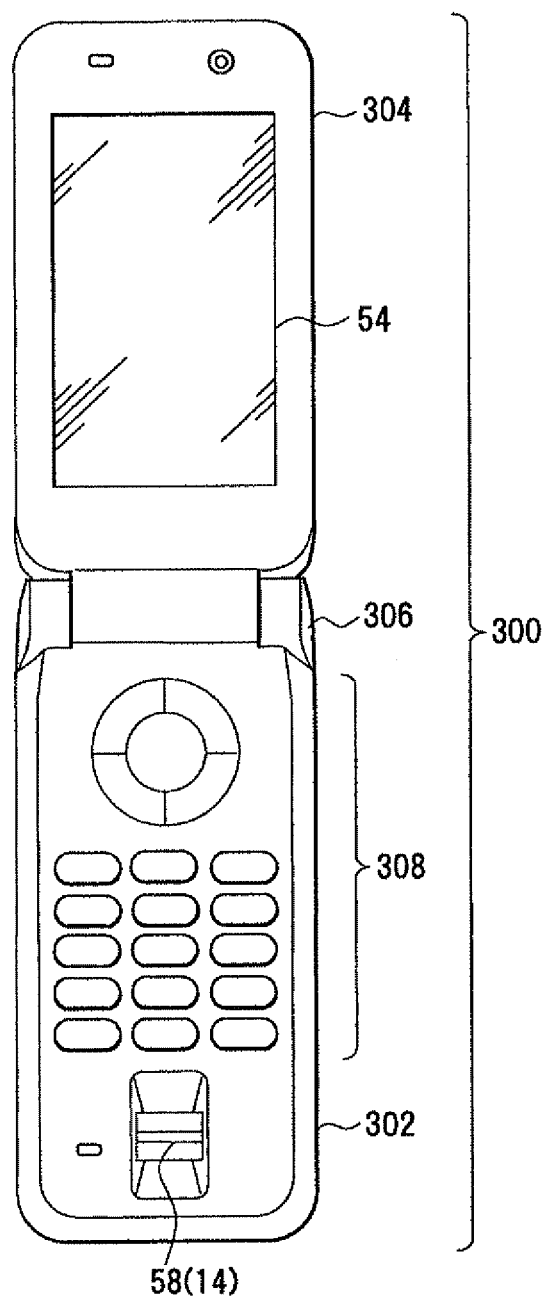
FIG. 30 depicts a portable device.
Figure 31:
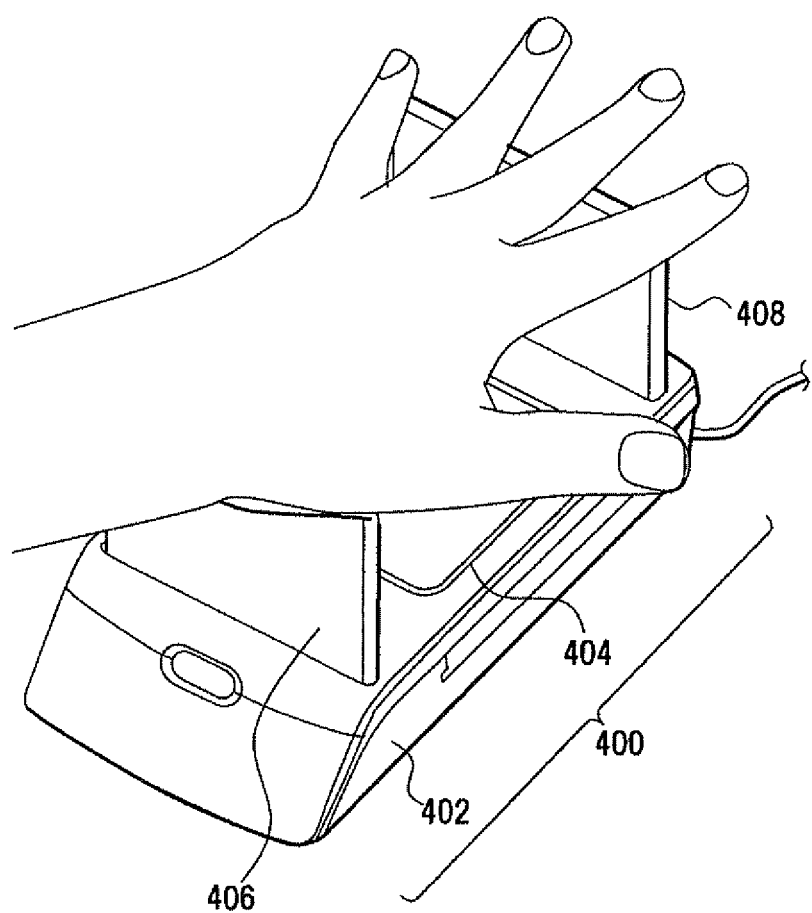
FIG. 31 depicts a vein authentication apparatus.

An example of an authentication apparatus will now refer to FIGS. 28, 29, 30 and 31. FIG. 28 depicts a personal computer (PC), FIG. 29 depicts a personal Digital Assistant (PDA), FIG. 30 depicts a portable device and FIG. 31 depicts a vein authentication apparatus. In FIGS. 28-31, the same components as described in FIGS. 8 and 26 are denoted by the same reference numerals.

A PC 100 is one example of an electronic apparatus mounting the fingerprint authentication apparatus 12 (FIG. 26). As shown in FIG. 28, it is configured of a casing 102 and a casing 104 openably and closenably via a hinge 106. At the casing 102, a keyboard 108 is disposed, and the fingerprint sensor 58 is also disposed as the fingerprint image reading unit 14 (FIG. 8). At the casing 104, the display 54 is mounted.

According to such structure, by fingerprint information taken in from the fingerprint sensor 58, as described above, determination accuracy whether a living body or a forgery is enhanced, and a PC that can perform high reliable authentication can be provided.

A PDA 200 is one example of an electronic apparatus mounting the fingerprint authentication apparatus 12 (FIG. 26). As shown in FIG. 29, at a casing 202, the fingerprint sensor 58 is disposed as an input unit 204 and the fingerprint image reading unit 14 (FIG. 8), and the display 54 is also disposed.

According to such structure, determination accuracy whether a living body or a forgery is enhanced as well, and a PDA that can perform high reliable authentication can be provided.

A portable device 300 is one example of an electronic apparatus mounting the fingerprint authentication apparatus 12 (FIG. 26). As shown in FIG. 30, it is configured of a casing 302 and a casing 304 openably and closenably via a hinge 306. At the casing 302, a keyboard 308 is disposed, and the fingerprint sensor 58 is also disposed as the fingerprint image reading unit 14 (FIG. 8). At the casing 304, the display 54 is mounted.

According to such structure, determination accuracy whether a living body or a forgery is enhanced as well, and a portable device that can perform high reliable authentication can be provided.

A vein authentication apparatus 400 is one example of an electronic apparatus mounting an authentication apparatus. As shown in FIG. 31, a capturing image unit 404 is provided with a casing 402. Support parts 406 and 408 that support a palm with sandwiching the capturing image unit 400 are disposed. It is configured that vein information is obtained from a palm image taken by the capturing image unit 404. In this example, whether a living body or a forgery can be accurately distinguished, and an authentication error by a forgery can be prevented.

While the most preferred embodiments of the present invention have been described hereinabove, the present invention is not limited to the above embodiments, and it is a matter of course that various variations and modifications can be made by those skilled in the art within the scope of the claims without departing from the spirit of the invention disclosed herein, and needless to say, such variations and modifications are also encompassed in the scope of the present invention.

The present invention utilizes characteristic information that a forgery has such that a gummy finger made from gelatin has, and distinguishes whether a forgery or a living body. There is no need to dispose special hardware, authentication accuracy of a living body can be enhanced, thus the present invention is useful.

What is claimed is:

1. An authentication apparatus that uses image information, comprising:
    an image information reading unit that reads in input image information;
    a feature information extraction unit that extracts input feature information from the input image information read in by the image information reading unit;
    a verification unit that verifies the input feature information extracted by the feature information extraction unit and registered feature information registered in advance, and determines whether the input feature information matches the registered feature information; and
    a forgery distinction unit that distinguishes that the input image information is by a forgery if the input feature information extracted by the feature information extraction unit uniformly reduces or expands compared with the registered feature information.

2. An authentication apparatus according to claim 1, wherein
    the input image information is an input fingerprint image, and
    the forgery distinction unit distinguishes that the input fingerprint image is by a false finger if the input feature information extracted from the input fingerprint image reduces uniformly.

3. An authentication apparatus according to claim 1, wherein
    the input image information is an input fingerprint image, and
    the forgery distinction unit distinguishes that the input fingerprint image is by a false finger if the input feature information extracted from the input fingerprint image reduces uniformly when the verification unit determines that the input feature information matches the registered feature information.

4. An authentication apparatus according to claim 1, wherein
    the input feature information and the registered feature information are fingerprint feature point information, and wherein the forgery distinction unit calculates a rate of matching feature points of shorter distances per a plurality of matching feature points, and concerning the matching feature points of shorter distances, a distance between an input feature point and a center of an input fingerprint is shorter than a distance between a registered feature point corresponding to the input feature point and a center of registered fingerprint, and distinguishes that the input image information is by a false finger if the rate is larger than a predetermined threshold level.

5. An authentication apparatus according to claim 1, wherein
    the input feature information and the registered feature information are fingerprint feature point information, and wherein the forgery distinction unit calculates a rate of matching feature points of shorter distances per a plurality of matching feature points, and concerning the matching feature points of shorter distances, a distance between an input feature point and a center of an input fingerprint is shorter than a distance of a predetermined ratio for a distance between a registered feature point corresponding to the input feature point and a center of registered fingerprint, and distinguishes that the input image information is by a false finger if the rate is larger than a predetermined threshold level.

6. An authentication apparatus according to claim 4, wherein
    the forgery distinction unit selects the predetermined number of the matching feature points in order of longer distance between the matching feature points and the center of fingerprint, and calculates the rate from distances between the selected matching feature points and the center of fingerprint.

7. An authentication apparatus according to claim 5, wherein
    the forgery distinction unit selects the predetermined number of the matching feature points in order of longer distance between the matching feature points and the center of fingerprint, and calculates the rate from distances between the selected matching feature points and the center of fingerprint.

8. An authentication apparatus according to claim 1, wherein
the input feature information and the registered feature information are fingerprint feature point information, and wherein the forgery distinction unit calculates a rate of input matching feature points of shorter distances, and concerning the input matching feature points of shorter distances, a distance between the input matching feature points is shorter than a distance between registered matching feature points corresponding to the input matching feature points, and distinguishes that the input image information is by a false finger if the rate is larger than a predetermined threshold level.

9. An authentication apparatus according to claim 1, wherein
the input feature information and the registered feature information are fingerprint feature point information, and wherein the forgery distinction unit calculates a rate of input matching feature points of shorter distances, and concerning the input matching feature points of shorter distances, a distance between the input matching feature points is shorter than a distance of a predetermined ratio for a distance between registered matching feature points corresponding to the input matching feature points, and distinguishes that the input image information is by a false finger if the rate is larger than a predetermined threshold level.

10. An authentication apparatus according to claim 8, wherein
the forgery distinction unit selects the predetermined number of pairs of matching feature points in order of longer distance between the matching feature points, and calculates the rate from distances between the selected matching feature points.

11. An authentication apparatus according to claim 9, wherein
the forgery distinction unit selects the predetermined number of pairs of matching feature points in order of loner distance between the matching feature points, and calculates the rate from distances between the selected matching feature points.

12. An authentication apparatus according to claim 4, wherein
the forgery distinction unit distinguishes that the input image information is by the false finger if the rate calculated for the forgery determination is larger than the predetermined threshold level, and requests input of the input image information if the rate is smaller than the threshold level and larger than a predetermined re-input threshold level.

13. An authentication apparatus according to claim 5, wherein
the forgery distinction unit distinguishes that the input image information is by the false finger if the rate calculated for the forgery determination is larger than the predetermined threshold level, and requests input of the input image information if the rate is smaller than the threshold level and larger than a predetermined re-input threshold level.

14. An authentication apparatus according to claim 6, wherein
the forgery distinction unit distinguishes that the input image information is by the false finger if the rate calculated for the forgery determination is larger than the predetermined threshold level, and requests input of the input image information if the rate is smaller than the threshold level and larger than a predetermined re-input threshold level.

15. An authentication apparatus according to claim 7, wherein
the forgery distinction unit distinguishes that the input image information is by the false finger if the rate calculated for the forgery determination is larger than the predetermined threshold level, and requests input of the input image information if the rate is smaller than the threshold level and larger than a predetermined re-input threshold level.

16. An authentication apparatus according to claim 8, wherein
the forgery distinction unit distinguishes that the input image information is by the false finger if the rate calculated for the forgery determination is larger than the predetermined threshold level, and requests input of the input image information if the rate is smaller than the threshold level and larger than a predetermined re-input threshold level.

17. An authentication apparatus according to claim 9, wherein
the forgery distinction unit distinguishes that the input image information is by the false finger if the rate calculated for the forgery determination is larger than the predetermined threshold level, and requests input of the input image information if the rate is smaller than the threshold level and larger than a predetermined re-input threshold level.

18. An authentication apparatus according to claim 10, wherein
the forgery distinction unit distinguishes that the input image information is by the false finger if the rate calculated for the forgery determination is larger than the predetermined threshold level, and requests input of the input image information if the rate is smaller than the threshold level and larger than a predetermined re-input threshold level.

19. An authentication apparatus according to claim 11, wherein
the forgery distinction unit distinguishes that the input image information is by the false finger if the rate calculated for the forgery determination is larger than the predetermined threshold level, and requests input of the input image information if the rate is smaller than the threshold level and larger than a predetermined re-input threshold level.

20. An authentication apparatus according to claim 1, wherein
the forgery distinction unit verifies expanded input feature information, that is obtained by extraction of feature information after an input image is expanded, with the registered feature information, and distinguishes that the input image information is by a false finger when a degree of similarity obtained from a result of verifying is higher than a predetermined ratio to a degree of the similarity obtained at the verification unit.

21. An authentication apparatus according to claim 1, wherein
the forgery distinction unit verifies the input feature information with reduced registered feature information, that is obtained by extraction of feature information after a registered image is reduced, and distinguishes that the input image information is by a false finger when a degree of similarity obtained from a result of verifying is higher than a predetermined ratio to a degree of the similarity obtained at the verification unit.

22. An authentication apparatus according to claim 21, further comprising a reduction feature information storing unit that stores reduced feature information reduced by a plurality of powers in advance.

23. An authentication apparatus according to claim 20, wherein
the forgery distinction unit distinguishes that the input image information is by the false finger if the calculated degree of the similarity is larger than a predetermined false finger threshold level, and requests input of the input image information if the degree is smaller than the false finger threshold level and larger than a predetermined re-input threshold level.

24. An authentication apparatus according to claim 21, wherein
the forgery distinction unit distinguishes that the input image information is by the false finger if the calculated degree of the similarity is larger than a predetermined false finger threshold level, and requests input of the input image information if the degree is smaller than the false finger threshold level and larger than a predetermined re-input threshold level.

25. An authentication apparatus that uses bio information, comprising:
a bio information reading unit that reads in input bio information;
a feature information extraction unit that extracts input feature information from the input bio information read in by the bio information reading unit;
a verification unit that verifies the input feature information extracted at the feature information extraction unit with registered feature information registered in advance, and determines whether the input feature information matches the registered feature information; and
a forgery distinction unit that determines that the input bio information is by a forgery if the input feature information extracted at the feature information extraction unit uniformly reduces or expands compared with the registered feature information.

26. An authentication apparatus according to claim 25, wherein
the input bio information is an input fingerprint image, and
the forgery distinction unit determines that the input fingerprint image is by the forgery if the input feature information extracted from the input fingerprint image reduces uniformly.

27. An authentication method that uses image information, comprising:
reading in input image information;
extracting input feature information from the read in input image information;
verifying the input feature information with registered feature information registered in advance, and determining whether the input feature information matches the registered feature information; and
determining the input image information to be by a forgery if the input image feature information uniformly reduces or expands compared with the registered feature information.

28. An authentication method according to claim 27, further comprising determining that the input image information is by a false finger if the input feature information extracted from the input image information reduces uniformly.

* * * * *

UNITED STATES PATENT AND TRADEMARK OFFICE
CERTIFICATE OF CORRECTION

Page 1 of 1

PATENT NO. : 8,520,914 B2
APPLICATION NO. : 12/323668
DATED : August 27, 2013
INVENTOR(S) : Koichiro Niinuma It is certified that error appears in the above-identified patent and that said Letters Patent is hereby corrected as shown below:

In Title Page item [74] Col. 2 (Attorney, Agent, or Firm), Line 1, Delete "LLP." and insert -- LLP --, therefor.

In the Claims

Col. 25, Line 41, In Claim 11, Delete "loner" and insert -- longer --, therefor.

Signed and Sealed this
Twenty-fourth Day of December, 2013

Margaret A. Focarino
*Commissioner for Patents of the United States Patent and Trademark Office*